United States Patent
Loewenstein

(10) Patent No.: US 9,679,084 B2
(45) Date of Patent: Jun. 13, 2017

(54) MEMORY SHARING ACROSS DISTRIBUTED NODES

(71) Applicant: Oracle International Corporation, Redwood Shores, CA (US)

(72) Inventor: Paul N. Loewenstein, Palo Alto, CA (US)

(73) Assignee: Oracle International Corporation, Redwood Shores, CA (US)

( * ) Notice: Subject to any disclaimer, the term of this patent is extended or adjusted under 35 U.S.C. 154(b) by 694 days.

(21) Appl. No.: 13/828,983

(22) Filed: Mar. 14, 2013

(65) Prior Publication Data

US 2014/0279894 A1   Sep. 18, 2014

(51) Int. Cl.
*G06F 15/167* (2006.01)
*G06F 17/30* (2006.01)

(52) U.S. Cl.
CPC .............................. *G06F 17/30994* (2013.01)

(58) Field of Classification Search
CPC . G06F 9/3834; G06F 12/0804; G06F 13/1657
USPC ........................................................ 709/216
See application file for complete search history.

(56) References Cited

U.S. PATENT DOCUMENTS

| | | | | |
|---|---|---|---|---|
| 5,561,799 A * | 10/1996 | Khalidi | ............. | G06F 17/30067 707/809 |
| 5,684,977 A * | 11/1997 | Van Loo | ............. | G06F 12/0828 711/120 |
| 6,148,377 A | 11/2000 | Carter et al. | | |
| 6,151,688 A * | 11/2000 | Wipfel | .................. | G06F 11/008 709/224 |
| 6,230,240 B1 * | 5/2001 | Shrader | ................. | G06F 3/0607 710/302 |
| 6,292,705 B1 * | 9/2001 | Wang | .................. | G06F 12/0822 700/5 |
| 6,295,571 B1 * | 9/2001 | Scardamalia | ....... | G06F 13/1663 710/308 |

(Continued)

FOREIGN PATENT DOCUMENTS

WO   WO 0219115 A2   3/2002
WO   WO 2010/039895 A2   4/2010

OTHER PUBLICATIONS

U.S. Appl. No. 13/828,555, filed Mar. 14, 2013.

(Continued)

*Primary Examiner* — Phuoc Nguyen
(74) *Attorney, Agent, or Firm* — Hickman Palermo Becker Bingham LLP

(57) ABSTRACT

A method and apparatus are disclosed for enabling nodes in a distributed system to share one or more memory portions. A home node makes a portion of its main memory available for sharing, and one or more sharer nodes mirrors that shared portion of the home node's main memory in its own main memory. To maintain memory coherency, a memory coherence protocol is implemented. Under this protocol, a special data value is used to indicate that data in a mirrored memory location is not valid. This enables a sharer node to know when to obtain valid data from a home node. With this protocol, valid data is obtained from the home node and updates are propagated to the home node. Thus, no "dirty" data is transferred between sharer nodes. Consequently, the failure of one node will not cause the failure of another node or the failure of the entire system.

39 Claims, 6 Drawing Sheets

(56) References Cited

U.S. PATENT DOCUMENTS

| | | | |
|---|---|---|---|
| 7,197,647 | B1 | 3/2007 | Van Essen |
| 7,664,938 | B1 | 2/2010 | Tripathi |
| 8,504,791 | B2 | 8/2013 | Cheriton |
| 8,732,386 | B2* | 5/2014 | O'Krafka ............ G06F 12/0284 711/103 |
| 2004/0064653 | A1 | 4/2004 | Gharachorloo et al. |
| 2006/0095690 | A1 | 5/2006 | Craddock |
| 2008/0065835 | A1* | 3/2008 | Iacobovici .......... G06F 12/0817 711/141 |
| 2009/0240664 | A1 | 9/2009 | Dinker et al. |
| 2009/0240869 | A1* | 9/2009 | O'Krafka ............ G06F 12/0284 711/103 |
| 2010/0030796 | A1 | 2/2010 | Netz et al. |
| 2013/0013843 | A1 | 1/2013 | Radovic et al. |
| 2013/0036332 | A1 | 2/2013 | Gove et al. |
| 2013/0191330 | A1 | 7/2013 | Aronovich |
| 2013/0232344 | A1 | 9/2013 | Johnson |
| 2014/0095810 | A1 | 4/2014 | Loewenstein et al. |
| 2014/0115283 | A1 | 4/2014 | Radovic |
| 2015/0227414 | A1 | 8/2015 | Varma |
| 2015/0278103 | A1 | 10/2015 | Radovic et al. |

OTHER PUBLICATIONS

Zeffer et al., "Flexibility Implies Performance", Appears in Proceedings of the 20th IEEE International Parallel & Distributed Processing Symposium (IPDPS 2006), Rhodes Island, Greece, dated Apr. 2006, 14 pages.
Hagersten, Erik, "Toward Scalable Cache Only Memory Architectures", Department of Telecommunications and Computer Systems, The Royal Institute of Technology, Stockholm, Sweden, dated Oct. 1992, 274 pages.
Karlsson et al., "Timestamp-based Selective Cache Allocation", In High Performance Memory Systems, edited by H. Hadimiouglu, D. Kaeli, J. Kuskin, A. Nanda, and J. Torrellas, Springer-Verlag, 2003. Also published in Proceedings of the Workshop on Memory Performance Issues (WMPI 2001), held in conjunction with the 28th International Symposium on Computer Architecture (ISCA28).
Karlsson et al., "Exploring Processor Design Options for Java-Based Middleware", In Proceedings of the 2005 International Conference on Parallel Processing (ICPP-05), Oslo, Norway, dated Jun. 2005, 10 pages.
Berg, Erik,"Methods for Run Time Analysis of Data Locality" Department of Information Technology, Uppsala University, dated Dec. 2003, 84 pages.
Lof et al:., "THROOM—Supporting POSIX Multithreaded Binaries on a Cluster", In Proceedings of the 9th International Euro-Par Conference (Euro-Par 2003), Klagenfurt, Austria, dated Aug. 2003, 10 pages.
Magnusson et al., "Queue Locks on Cache Coherent Multiprocessors", In Proceedings of the Hawaii International Conference on System Sciences (HICSS), dated Jan. 1994. (The original Simple COMA paper.), 7 pages.
Wallin et al., "Multigrid and Gauss-Seidel Smoothers Revisited: Parallelization on Chip Multiprocessors", In Proc. 20th ACM International Conference on Supercomputing, ACM Press, dated 2006, 11 pages.
Petoumemenos et al., "Modeling Cache Sharing on Chip Multiprocessor Architectures", In Proceedings of the 2006 IEEE International Symposium of Workload Characterization: San Jose, California, USA, dated 2006, 12 pages.
Radovic, Zoran, "DZOOM-Low Latency Software Based Shared Memory", UPTEC F-00-093, ISSN 1401-5757, School of Engineering, Uppsala University, Sweden, dated Dec. 2000, 51 pages.
Radovic et al., "Implementing Low Latency Distributed Software-Based Shared Memory", In Proceedings of the Workshop on Memory Performance Issues (WMPI 2001), held in conjunction with the 28th International Symposium on Computer Architecture (ISCA28), Göteborg, Sweden, dated Jun. 2001, 12 pages.
Radovic et al., "Removing the Overhead from Software-Based Shared Memory", In Proceedings of Supercomputing 2001 (SC2001), Denver, Colorado, USA, dated Nov. 2001, 13 pages.
Radovic et al., "RH Lock: A Scalable Hierarchical Spin Lock", In Proceedings of the 2nd Annual Workshop on Memory Performance Issues (WMPI 2002), held in conjunction with the 29th International Symposium on Computer Architecture (ISCA29), Anchorage, Alaska, USA, dated May 2002, 10 pages.
Radovic et al., "Efficient Synchronization for Nonuniform Communication Architecture", In Proceedings of Supercomputing 2002 (SC2002), Baltimore, Maryland, USA, dated Nov. 2002, 13 pages.
Radovic et al., "Hierarchical Backoff Locks for Nonuniform Communication Architecture" In Proceedings of the Ninth International Symposium on High Performance Computer Architecture (HPCA-9), Anaheim, California, USA, dated Feb. 2003, 12 pages.
Singhal et al., "Gigaplane: A High Performance Bus for Large SMPs", In Proceedings of the IEEE Hot Interconnect IV, pp. 41-52, Stanford University, dated Aug. 1996, 12 pages.
Spjuth, Mathias, "Refinement and Evaluation of the Elbow Cache", UPTEC F-02-033, ISSN 1401-5757, School of Engineering, Uppsala University, Sweden, dated Apr. 2002, 12 pages.
Berg et al., "StatCache: A Probabilistic Approach to Efficient and Accurate Data Locality Analysis", In Proceedings of the 2004 IEEE International Symposium on Performance Analysis of Systems and Software (ISPASS-2004), Austin, Texas, USA, dated Mar. 2004, 26 pages.
Wallin, Dan, "Performance of a High-Accuracy PDE Solver on a Self-Optimizing NUMA Architecture", In Journal of Parallel Algorithms and Applications, vol. 17, No. 4, dated 2003, 29 pages.
Wallin et al., "Miss Penalty Reduction Using Bundled Capacity Prefetching in Multiprocessors", In Proceedings of the 17th International Parallel and Distributed Processing Symposium (IPDPS 2003), Nice, France, dated Apr. 2003, 9 pages.
Wallin et al., "Cache Memory Behavior of Advanced PDE Solvers", In Proceedings of Parallel Computing 2003 (ParCo2003), Dresden, Germany, dated Sep. 2003, 6 pages.
Wallin et al., "Bundling: Reducing the Overhead of Multiprocessor Prefetchers", Technical Report 2003-037, Department of Information Technology, Uppsala University, dated Aug. 2003, 10 pages.
Walin et al., "Vasa: A Simulator Infrastructure With Adjustable Fidelity", In Proceedings of the 17th IASTED International Conference on Parallel and Distributed Computing and Systems (PDCS 2005), Phoenix, Arizona, USA, dated.
Zeffer et al., "Exploiting Spatial Store Locality Through Permission Caching in Software DSMs", In Proceedings of the 10th International Euro-Par Conference (Euro-Par 2004), Pisa, Italy, dated Aug. 2004, 10 pages.
Zeffer et al., "Exploiting Locality: A Flexible DSM Approach", In Proceedings of the 20th IEEE International Parallel & Distributed Processing Symposium (IPDPS 2006), Rhodes Island, Greece, dated Apr. 2006, 10 pages.
Zeffer et al., "A Case for Low-Complexity Multi-CMP Architectures", Technical report 2006-031, Department of Information Technology, Uppsala University, dated Jun. 2006, 14 pages.
Zeffer et al., A Trap-Based Memory Architecture, In Proceedings of the 20th ACM International Conference on Supercomputing (ICS 2006), Cairns, Queensland, Australia, dated Jun. 2006, 10 pages.
Karlsson et al., "Memory System Behavior of Java-Based Middleware" In Proceedings of the Ninth International Symposium on High Performance Computer Architecture (HPCA-9), Anaheim, California, USA, dated Feb. 2003, 12 pages.
Cockshott et al., "High-Performance Operations Using a Compressed Database Architecture" dated Aug. 12, 1998, 14 pages.
Radovic, Zoran, "Efficient Synchronization and Coherence for Nonuniform Communication Architectures", Department of Information Technology, Uppsala University, dated Sep. 2003, 170 pages.
Karlsson, Martin, "Cache Memory Design Trade-Offs for Current and Emerging Workloads", Department of Information Technology, Uppsala University, dated Sep. 2003, 82 pages.
Wallin, Dan, "Exploiting Data Locality in Adaptive Architectures", Department of Information Technology, Uppsala University, data Sep. 2003, 122 pages.

(56) References Cited

OTHER PUBLICATIONS

Grenholm et al., "Latency-hiding Optimizations of the DSZOOM Instrumentation System" Department of Information Technology, Uppsala University, dated May 2003, 23 pages.
Walin et al., "Bundling: Reducing the Overhead Multiprocessor Prefetchers" Department of Information Technology, Uppsala University, dated Aug. 2003, 12 pages.
Walin et al., "Cache Memory Behavior of Advanced PDE Solvers", Department of Information Technology, Uppsala University, dated Aug. 2003, 9 pages.
Spjuth et al., "The Elbow Cache: A Power-Efficient Alternative to Highly Associative Caches", Department of Information Technology, Uppsala University, dated Sep. 2003, 9 pages.
Zeffer, et al., "Evaluation, Implementation and Performance of Write Permission Caching in the DSZOOM System", Technical report 2004-005, Department of Information Technology, Uppsala University, dated Feb. 2004., 23 pages.
Spjuth et al., "Low-Power and Conflict Tolerant Cache Design", Technical report 2004-024, Department of Information Technology, Uppsala University, dated May 2004, 10 pages.
Selen, Thorild, "Reorganisation in the skewed-associative TLB", Technical report 2004-027, Department of Information Technology, Uppsala University, dated Sep. 2004. (Master's thesis), 68 pages.
Zeffer, Hakan, "Hardware-Software Tradeoffs in Shared-Memory Implementations", PhD thesis, Department of Information Technology, Uppsala University, dated Nov. 2005, 106 pages.
Zeffer, Hakan, "Adaptive Coherence Batching for Trap-Based Memory Architectures", Licentiate Thesis 2005-002, Department of Information Technology, Uppsala University, dated May 2005, 11 pages.
Albertsson et al., "Using Complete System Simulation for Temporal Debugging of General Purpose Operating Systems and Workloads", In Proceedings of the 8th International Symposium on Modeling, Analysis and Simulation of Computer and Telecommunication Systems (MASCOTS 2000), San Francisco, California, USA, dated Aug. 2000, 8 pages.
Albertsson et al., "Simulation-Based Temporal Debugging of Inux", In Proceedings of the 2nd Real-Time Linux Workshop, Lake Buena Vista, Florida, USA, dated Nov. 2000, 7 pages.
Albertsson, Lars, "Simulation-Based Debugging of Soft Real Time Applications", In Proceedings of the Real-Time Application Symposium, IEEE Computer Society, IEEE Computer Society Press, dated May 2001, 2 pages.
Berg et al., "SIP: Performance Tuning Through Source Code Interdependence", In Proceedings of the 8th International Euro-Par Conference (Euro-Par 2002), Paderborn, Germany, dated Aug. 2002, 10 pages.
Berg et al., StatCache: A Probabilistic Approach to Efficient and Accurate Data Locality Analysis, Technical report 2003-058, Department of Information Technology, Uppsala University, dated Nov. 2003, 8 pages.
Berg et al., "Fast Data-Locality Profiling of Native Execution", In Proceedings of ACM SIGMETRICS 2005, Banff, Canada, dated Jun. 2005, 12 pages.
Berg et al., "A Statistical Multiprocessor Cache Model", In Proceedings of the 2006 IEEE International Symposium on Performance Analysis of Systems and Software (ISPASS-2006), Austin, Texas, USA, dated Mar. 2006, 11 pages.
Berg et al., "Low Overhead Spatial and Temporal Data Locality Analysis", Department of Information Technology, Uppsala University, dated Nov. 2003, 30 pages.
Spjuth et al., "Skewed Caches from a Low-Powered Perspective", In Proceedings of Computing Frontiers, Ischia, Italy, dated May 2005, 9 pages.
Zeffer, Hakan, "Towards Low-Complexity Scalable Shared-Memory Architectures", Thesis Department of Information Technology, Uppsala University, dated Oct. 2006. ISBN 91-554-6647-8., 50 pages.
Lof, Henrik, "Iterative and Adaptive PDE Solvers for Shared Memory Architectures", Thesis Department of Information Technology, Uppsala University, dated Oct. 2006. SBN 91-554-6648-6, 58 pages.
Wallin, Dan, "Methods for Creating and Exploiting Data Locality", Thesis Department of Information Technology, Uppsala University, dated May 2006. ISBN 91-554-6555-2, 38 pages.
Berg, Erik, "Efficient and Flexible Characterization of Data Locality through Native Execution Sampling", Department of Information Technology, Uppsala University, dated Nov. 2005, 36 pages.
Karlsson, Martin, "Memory System Design for Chip-Multiprocessors", Thesis Department of Information Technology, Uppsala University, dated Jan. 2006. ISBN 91-554-6429-7, 34 pages.
Hagersten et al., "Simulating the Data Diffusion Machine", In Proceedings of the Parallel Architecture and Languages Europe (PARLE=EUROPAR), Springer-Verlag, dated Jun. 1993. (Best Presentation Award.), 18 pages.
Hagersten et al., "Simple COMA Node Implementations" In Proceedings of the Hawaii International Conference on System Sciences (HICSS), dated Jan. 1994. (The original Simple COMA paper.), 12 pages.
Hagersten et al., "Wildfire: A Scalable Path for SMPs", In Proceedings of the 5th International Symposium on High-Performance Computer Architecture (HPCA-5), pp. 172-181, Orlando, Florida, USA, dated Jan. 1999, 10 pages.
Hagersten et al., "Parallel Computing in the Commercial Marketplace Research and Innovation at Work", Scanning the DSM Technology in Proceedings of the IEEE, dated Mar. 1999, 12 pages.
Holmgren et al., "Performance of High-Accuracy PDE Solvers on a Self-Optimizing NUMA Architecture", UPTEC F-01-017, ISSN 1401-5757, School of Engineering, Uppsala University, Sweden, dated Feb. 2001, 9 pages.
Holmgren et al., "Performance of High-Accuracy PDE Solvers on a Self-Optimizing NUMA Architecture", In Proceedings of the 7th International Euro-Par Conference (Euro-Par 2001), Manchester, UK, dated Aug. 2001, 15 pages.
UU/IT/UPSALA Architecture Research Team. "Department of Technology, Publications", http://www.it.uu.se/research/group/uart/publications, last accessed Apr. 2, 2013, 9 pages.
UU/IT/DSZOOM Home Page. "Department of Technology, Low Latency Distributed Software-Based Shared Memory, DSZOOM", http://www.it.uu.se/research/group/uart/projects/dszoom, last accessed Apr. 2, 2013, 4 pages.
Landin et al., Race-Free Interconnection Networks and Multiprocessor Consistency, In Proceedings of the 18th International Symposium on Computer Architecture (ISCA), vol. 19, No. 3, pp. 106-115, Toronto, Canada, dated May 1991, 12 pages.
Petoumenos et al., Statshare: A Statistical Model for Managing Cache Sharing Via Decay, In 2006th Workshop on Modeling, Benchmarking and Simulation held in conjunction: with the 33rd Annual International Symposium on Computer Architecture, Boston, MA USA, dated Jun. 2006, 10 pages.
Zoran Radovic, "Efficient Synchronization Coherence for Nonuniform Communication" Uppsala University, dated Sep. 2003, 170 Pages.
Lof et al., "THROOM, Running POSIX Multithread Binaries on a Cluster", Technical Report 2003-026, Department of Information Technology, Uppsala University, Dated Apr. 2003, 11 pages.
Grenholm et al., "Latency-Hiding and Optimizations of the DSZOOM Instrumentation System", Technical Report 2003-029, Department of Information Technology, Uppsala University, dated May 2003, 23 pages.
Zeffer et al., "Evaluation, Implementation and Performance of Write Permission Caching in the DSZOOM System", Technical report 2004-005, Department of Information Technology, Uppsala University, Feb. 2004, 23 pages.
Zeffer, Hakan, "Hardware-Software Tradeoffs in Shared-Memory Implementations", Licentiate Thesis 2005-002, Department of Information Technology, Uppsala University, May 2005, 106 pages.
Zeffer et al., "Flexibility Implies Performance", Technical report 2005-013, Department of Information Technology, Uppsala University, dated Apr. 2005, 14 pages.

(56) References Cited

OTHER PUBLICATIONS

Zeffer et al., "TMA: A Trap-Based Memory Architecture", Technical report 2005-015, Department of Information Technology, Uppsala University, dated May 2005, 11 pages.
Ekstrom, Niklas, "Improving DSZOOM's Run Time System", Master's thesis, UPTEC F03 104, ISSN 1401-5757, School of Engineering, Uppsala University, Sweden, dated Jan. 2004, 32 pages.
Radovic, Zoran, "Software Techniques for Distributed Shared Memory", Doctoral Thesis, Department of Information Technology, Uppsala University, dated Nov. 2005, 133 pages.
Grenholm, Oskar, "Simple and Efficient Instrumentation for the DSZOOM System", UPTEC F-02-096, ISSN 1401-5757, School of Engineering, Uppsala University, Sweden, dated Dec. 2002, 46 pages.
Lof et al., "THROOM—Supporting POSIX Multithread Binaries on a Cluster", In Proceedings of the 9th International Euro-Par Conference (Euro-Par 2003), Klagenfurt, Austria, dated Aug. 2003, 10 pages.
Radovic, Zoran, "DSZOOM—Low Latency Software Based Shared Memory", Technical Report 2001:03, Parallel and Scientific Computing Institute (PSCI), Sweden, Apr. 2001, 24 pages.
Radovic, Zoran, "DSZOOM—Low Latency Software Based Shared Memory", UPTEC F-00-093, ISSN 1401-5757, School of Engineering, Uppsala University, Sweden, dated Dec. 2000, 51 pages.
Radovic et al., "Implementing Low Latency Distributed Software-Based Shared Memory", In Proceedings of the Workshop on Memory Performance Issues (WMPI 2001), held in conjunction with the 28th International Symposium on Computer Architecture (ISCA28), Göteborg, Sweden, Jun. 2001.
Radovic et al., "Removing the Overhead for Software-Based Shared Memory", In Proceedings of Supercomputing 2001, Denver, Colorado, USA, dated Nov. 2001, 13 pages.
Zeffer et al., "Exploiting Spatial Locality Through Permission Caching in Software DSMs", In Proceedings of the 10th International Euro-Par Conference (Euro-Par 2004), Pisa, Italy, dated Aug. 2004, 10 pages.
U.S. Appl. No. 13/828,555, filed Mar. 14, 2013, Office Action, Feb. 4, 2016.
U.S. Appl. No. 13/828,555, filed Mar. 14, 2013, Interview Summary, Apr. 28, 2016.
U.S. Appl. No. 13/828,555, filed Mar. 14, 2013, Final Office Action, Jun. 30, 2016.
Li et al., "Memory Coherence in Shared Virtual Memory Systems", ACM Transactions on Computer Systems, vol. 7, No. 4, dated Nov. 1989, 39 pages.
Lenoski et al., "The Directory-Based Cache Coherence Protocol for the DASH Multiprocessor", IEEE, dated 1990, 12 pages.
Kent, Christopher A., "Cache Coherence in Distributed Systems", dated Dec. 1987, Digital Western Research Laboratory, dated 1986, 90 pages.
Hardavellas et al., "Software Cache Coherence with Memory Scaling", dated Apr. 16, 1998, 2 pages.
Agarwal et al., "An Evaluation of Directory Schemes for Cache Cohrerence", Proceedings of the 15th Annual International Symposiumn on Computer Architecture, dated May 1988, 10 pages.
U.S. Appl. No. 14/530,354, filed Oct. 31, 2014, Office Action.
Radovic, U.S. Appl. No. 14/530,354, filed Oct. 31, 2014, Office Action.
Loewenstein, U.S. Appl. No. 13/828,555, filed Mar. 14, 2013, Final Office Action.

* cited by examiner

MEMORY SHARING ACROSS DISTRIBUTED NODES

FIELD OF THE INVENTION

This disclosure relates generally to computing systems and more particularly to a method and apparatus for enabling memory to be shared across distributed nodes.

BACKGROUND

Many functionalities and services available over the Internet or over a corporate network are provided by one or more clusters of distributed computing nodes. For example, a database used to run a large scale business may be maintained by, and made available through, a plurality of database servers running on a plurality of distributed computing nodes that form a cluster. Using a cluster of computing nodes to provide a functionality or service may give rise to a number of advantages. For example, with a cluster, it is relatively easy to add another node to increase the capacity of the system to meet increased demand. A cluster also makes it possible to load balance among the various nodes so that if one node becomes overburdened, work can be assigned to other nodes. In addition, a cluster makes it possible to tolerate failures so that if one or more nodes fail, the functionality or service is still available. For these and other reasons, large scale and mission critical services are often provided by one or more clusters of distributed nodes.

The nodes in a cluster often need to exchange/share information with each other. This information sharing may be necessary, for example, in order for the nodes to work together to carry out one or more transactions, to load balance, to implement failure prevention and recovery, etc. Typically, nodes in a cluster share information with each other using a request-response messaging model. Unfortunately, many of the existing messaging models require a significant amount of overhead, and impose a fair amount of latency. In particular, a client thread on one node typically needs to wake up a thread on another node in order to have requests serviced. This waking up may require waiting in queues and incurring delays from context switching. Hence, existing messaging models are inefficient and do not scale well. As a result, for large scale and even smaller scale distributed node systems, an improved information sharing mechanism is needed in order to enable the distributed nodes to exchange/share information with each other more efficiently and effectively.

DETAILED DESCRIPTION OF EMBODIMENT(S)

Overview

Figure 1:
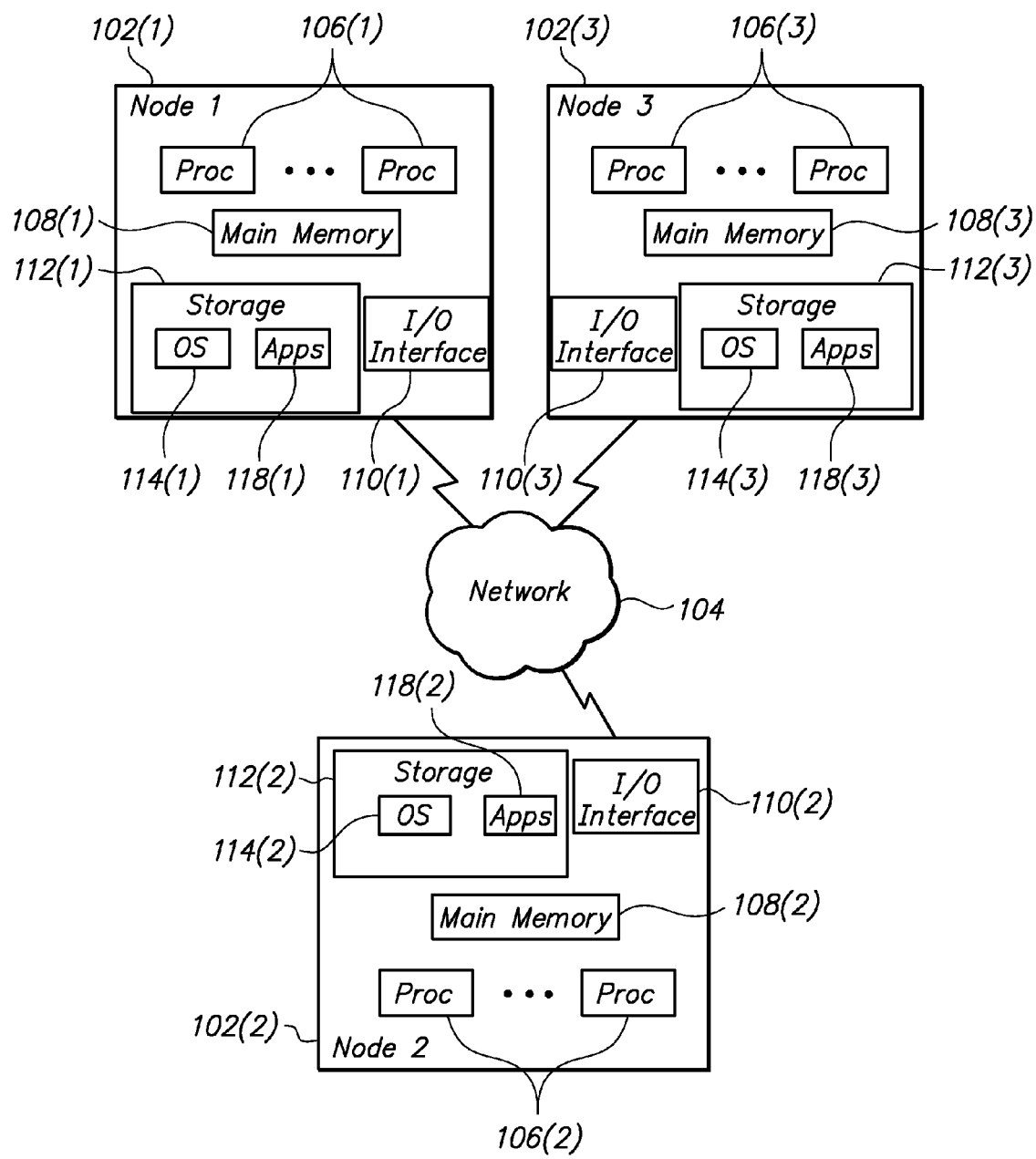
FIG. 1 is a block diagram of a sample distributed node system in which one embodiment of the present invention may be implemented.

In accordance with one embodiment of the present invention, a method and apparatus are provided for enabling nodes in a distributed node system to share one or more portions of their main memory with one or more other nodes. By sharing a portion of main memory with another node, it is meant that a node (referred to herein as the "home" node) makes a portion of its main memory available for sharing, and another node (referred to herein as the "sharer node") mirrors that portion of the home node's main memory in its own main memory. In effect, the sharer node maintains a copy of the contents of the home node's shared memory portion in a portion of its own main memory (this portion of the sharer node's main memory will be referred to herein as the mirrored portion of the sharer node's main memory). More than one sharer node may mirror the shared memory portion of the home node. With this sharing arrangement, a sharer node can access the contents of the shared memory portion of the home node by simply accessing the mirrored portion of its own main memory (assuming that the contents in the mirrored memory portion are currently valid). Thus, this arrangement enables information to be shared between the home node and the sharer node(s) with less overhead and less latency. Consequently, information sharing is made more efficient and more effective.

Since a sharer node maintains in its mirrored memory portion a copy of the contents of the shared memory portion of the home node, and since these contents may be updated by the home node or by a sharer node, there is potential for the various sets of contents to be out of synchronization. To ensure that data coherence is maintained across the distributed node system, a memory coherence protocol is implemented between the nodes.

Sharer Node Load

In one embodiment, a sharer node may load and use data from a particular memory location within the mirrored memory portion of its main memory as follows. The sharer node initially loads data from the particular memory location. To ensure that data coherence is maintained, the sharer node does not immediately use the data; rather, the sharer node first determines whether the data is valid. In one embodiment, the sharer node makes this determination by determining whether the loaded data has the same data value as a predetermined special data value. In one embodiment, the special data value is used to indicate invalid data. If the loaded data value is not the same as the special data value (thereby indicating that the loaded data is valid), then the sharer node may use the loaded data for further processing. However, if the loaded data value is the same as the special data value (thereby indicating that the loaded data is invalid), then the sharer node obtains valid data for the particular memory location from the home node. More specifically, the sharer node obtains valid data for the particular memory location from a corresponding memory location in the shared memory portion of the home node's main memory. As part of the process of obtaining the valid data, the sharer node may cause a directory entry, which is stored in the main memory of the home node and which is associated with the corresponding memory location in the shared memory portion of the home node, to be locked. The valid data obtained from the home node may be temporarily stored into an interim memory location in the sharer node's main memory.

In one embodiment, the sharer node may maintain a store buffer. This store buffer (which will be elaborated upon in a later section) may contain updated data that is intended to be stored into the corresponding memory location in the shared memory portion of the home node but which has not been propagated yet to the home node. If the store buffer does not contain any such updated data for the corresponding memory location, then the sharer node may store the valid data in the interim memory location into the particular memory location. However, if the store buffer does contain updated data for the corresponding memory location, then the sharer node may update the valid data in the interim memory location with the updated data from the store buffer to derive a set of modified valid data. The modified valid data in the interim memory location may then be stored into the particular memory location (note: the updated data remains in the store buffer so that it will eventually be propagated to the home node). By doing this, the sharer node causes the data in the particular memory location to reflect both the valid data from the corresponding memory location in the home node's main memory and the updated data from the store buffer.

In addition, the sharer node may cause the directory entry associated with the corresponding memory location to be updated to indicate that the sharer node is now a valid sharer of the corresponding memory location. The sharer node may also cause the directory entry to be unlocked. Thereafter, the sharer node may use the valid data (or the modified valid data) that was stored into the particular memory location for further processing.

In very rare instances, the particular memory location may contain valid data that just happens to have the same data value as the special data value. If this occurs, the sharer node will treat the valid data as invalid data (referred to herein as a "false miss"), and will operate in the manner described above. The end result will be that the valid data, having the special data value, will be obtained from the home node and stored again (unless it is updated with updated data from the store buffer) into the particular memory location. This false miss process will be implemented each time data is loaded from the particular memory location until the valid data is changed to some other value. While this false miss process may make loading data from the particular memory location less efficient, it should occur so rarely that its impact on system performance should be negligible.

Sharer Node Store

In one embodiment, a sharer node may store updated data into a particular memory location that is within the mirrored portion of its main memory as follows. Initially, the sharer node determines whether the data currently stored in the particular memory location is valid. The sharer node may do so by loading data from the particular memory location, and determining whether the loaded data has the same data value as a predetermined special data value (which is used to indicate invalid data). If the loaded data value is not the same as the special data value (thereby indicating that the loaded data is valid), then the sharer node may store a set of updated data into the particular memory location. However, if the loaded data value is the same as the special data value (thereby indicating that the loaded data is invalid), then the sharer node foregoes storing the updated data into the particular memory location. By not storing the updated data into the particular memory location when the loaded data is invalid, the sharer node prevents invalid data from being transformed into data that appears to be valid, which would jeopardize data coherency.

In addition to the above operations, the sharer node also stores the updated data into a store buffer on the sharer node. This updated data will at some point (barring failure of the sharer node) be retrieved from the store buffer and propagated to the home node to be stored into a corresponding memory location in the shared memory portion of the home node's main memory that corresponds to the particular memory location in the mirrored memory portion of the sharer node's main memory. In effect, storing the updated data into the store buffer causes the updated data to eventually be propagated to the home node. In one embodiment, if the store buffer already contains an existing set of updated data that is destined for the corresponding memory location of the home node's main memory, then the sharer node merges the new updated data with the existing updated data to give rise to a set of merged updated data.

At some point, the sharer node will retrieve the updated data from the store buffer and propagate it to the home node. To do so, the sharer node retrieves the updated data (or merged updated data) from an entry in the store buffer. In one embodiment, there is information stored in this entry that indicates that this updated data is destined for the corresponding memory location in the shared memory portion of the home node's main memory. To propagate the updated data to the home node, the sharer node may cause a directory entry, which is stored in the main memory of the home node and which is associated with the corresponding memory location in the shared memory portion of the home node's main memory, to be locked. The processor may also cause a copy of the contents of the directory entry to be obtained from the home node. In one embodiment, the directory entry contains information indicating which sharer nodes are currently valid sharers of the corresponding memory location. The currently valid sharers may include the current sharer node (i.e. the sharer node that is trying to propagate the updated data to the home node), and one or more other sharer nodes. Each of the other sharer nodes has a mirrored memory location in its main memory that corresponds to the corresponding memory location in the shared memory portion of the home node. In one embodiment, because the data in the corresponding memory location in the home node's main memory is to be updated, the sharer node causes the data in the mirrored memory location of each of the other sharer nodes to be invalidated. This may be done, for example, by causing the special data value, or another special data value used to indicate invalid data on the other sharer node(s), to be stored into the mirrored memory location of each of the other sharer nodes to indicate that the data in the mirrored memory location(s) is invalid. Doing so prevents the other sharer nodes from using invalid data.

The sharer node may also cause the copy of the contents of the directory entry to be updated to no longer indicate that the other sharer nodes are valid sharers of the corresponding memory location in the home node's main memory. In addition, the sharer node causes the updated data to be propagated to the home node and stored into the corresponding memory location in the shared memory portion of the home node's main memory. Furthermore, the sharer node may cause the updated contents of the directory entry to be stored into the directory entry on the home node, and cause the directory entry to be unlocked. Yet further, the sharer node removes the updated data from the store buffer. Propagation of the updated data to the home node is thus completed.

Home Node Load and Store

In one embodiment, a home node may load data from a memory location that is within the shared memory portion of its main memory in the same manner that it would load data from any other memory location. It is assumed, in one embodiment, that data in the shared memory portion of the home node's main memory is always valid; thus, it is not necessary to provide any special handling for loads from memory locations that are within the shared memory portion of the home node's main memory.

In one embodiment, a home node may store updated data into a particular memory location that is within the shared memory portion of its main memory as follows. Initially, the home node accesses and locks a directory entry that is stored in its main memory and that is associated with the particular memory location. In one embodiment, the directory entry contains information indicating which sharer nodes are currently valid sharers of the particular memory location. Each of the sharer nodes has a mirrored memory location in its main memory that corresponds to the particular memory location in the shared portion of the home node's main memory. In one embodiment, because the data in the particular memory location is to be updated, the home node causes the data in the mirrored memory location of each of the sharer nodes to be invalidated. This may be done, for example, by causing a special data value (which indicates invalid data) to be stored into the mirrored memory location of each of the sharer nodes. Doing so prevents the sharer nodes from using invalid data. The home node may also update the directory entry so that the directory entry no longer indicates the sharer nodes as being valid sharers of the particular memory location. In addition, the home node stores the updated data into the particular memory location, and unlocks the directory entry. In this manner, the home node may store updated data into a memory location that is within the shared memory portion of the home node's main memory.

Failure Containment

The memory coherence protocol set forth above ensures that memory coherence is maintained across all of the nodes in a distributed node system. This memory coherence protocol has an additional desirable property that a node failure is contained to that node. That is, the failure of one node will not cause another node or the overall system to fail. Notice from the above overview that valid data is obtained from the home node and updates are propagated to the home node. No "dirty" data (modified data that has not been propagated to the home node) is transferred from sharer node to sharer node. Because of this, if a node fails, all that is lost is: the data for which that node is the home node; and any updates made by that node that have not yet been propagated to a home node. Updates made by other nodes are not lost. Hence, the failure of one node will not cause the failure of another node or the failure of the entire system. This failure containment property (as well as other properties) of the above memory coherence protocol makes it a desirable protocol to implement in distributed node systems that provide mission critical or other important functionalities and services.

Sample System

With reference to FIG. 1, there is shown a block diagram of a sample distributed node system 100 in which one embodiment of the present invention may be implemented. As shown, system 100 comprises node 1 102(1), node 2 102(2), and node 3 102(3). It should be noted that three nodes are shown for illustrative purposes only. For purposes of the present invention, system 100 may have any desired number of nodes. For referencing purposes, similar elements will be referenced using the same reference number. For example, the reference number 102 is used for each of the nodes. This reference number will be used when referring to a node generally. When it is desired to refer to a specific node, then an additional index will be used. For example, when referring to node 2, the reference number 102(2) will be used. This convention will be used for the other elements as well.

In one embodiment, the various nodes 102 may be geographically distributed. Thus, to enable the nodes 102 to communicate with each other, a network 104 may be provided. For purposes of the present invention, the network 104 may be any type of mechanism that enables communication to be conducted between the nodes 102, including but not limited to a simple wired interconnect, a switched fabric, a packet switched network, an Ethernet network, an IP network, a LAN, a WAN, the Internet, a wireless network, etc.

Each node 102 may comprise one or more processors 106, a main memory 108, and a storage 112. The storage 112, which may, for example, be a persistent storage such as a hard drive, a flash memory, etc., may store an operating system 114 and one or more applications 118. In one embodiment, the operating system 114 and/or the one or more applications 118 may include program instructions that, when executed by one or more of the processors 106, cause the one or more processors 106 to implement as least a portion of the memory coherence protocol disclosed herein. During operation, the operating system 114 and applications 118 may be loaded into main memory 108. While in main memory 108, the instructions in the operating system 114 and the applications 118 may be executed by the one or more processors 106 to implement the memory coherence protocol described herein, as well as to provide other functionalities. In one embodiment, each node 102 may be a symmetric multiprocessing computing (SMP) node that is capable of supporting multi-threaded processing.

The main memory 108 of a node 102 comprises a plurality of memory locations. For purposes of the present invention, a memory location may be of any desired size. For example, a memory location may be as small as a single data word or as large as a page or larger. A memory location may be accessed using a physical address. This physical address may be mapped to one or more virtual addresses by way of an address translation table. If set large enough, a memory location may contain enough data to span multiple virtual addresses. In such a case, several virtual addresses may map to the same physical address (i.e. the same memory location), with the different virtual addresses mapping to different offsets within the memory location.

In addition to the elements already described, each node 102 may further comprise an input/output (I/O) interface 110. In one embodiment, the I/O interface 110 on a node 102 is coupled to the one or more processors 106, the main memory 108, and the storage 112 (among other components) on that node 102. The I/O interface 110 may also be coupled directly or indirectly (e.g. through a network interface) to the network 104 to enable the I/O interface 110 to communicate and interact with other I/O interfaces 110 on other nodes 102. In one embodiment, the I/O interfaces 110 on the various nodes 102 facilitate the sharing of memory between the nodes 102 and the implementation of the memory coherence protocol described herein. Given the I/O interfaces 110, it is not necessary for the processors 106 on the nodes 102 to execute dedicated threads to perform the tasks needed to implement memory sharing. Hence, the I/O interfaces 110 free up processor resources.

For purposes of the present invention, an I/O interface 110 may take on any desired form. For example, an I/O interface 110 may be a set of hardware elements, including logic elements, that are hardwired to provide a certain set of functionalities. Alternatively, an I/O interface 110 may be a device (e.g. an ASIC, an FPGA, etc.) having elements, including logic elements, that are configured to provide a certain set of functionalities. As a further alternative, an I/O interface 110 may include one or more processors capable of executing instructions to give rise to one or more functionalities. These and other forms are within the scope of the present invention. In the above discussion, an I/O interface 110 is described as being a hardware component. It should be noted, though, that this is not required. If so desired, the functionalities of the I/O interface 110 may be realized by having one or more of the processors 106 execute instructions that give rise to the functionalities. While this is not as efficient an implementation as the hardware implementation, it is a possible one. All such implementations are within the scope of the present invention. In a particular embodiment used as an example in later sections, the I/O interface 110 comprises a hardware processor that executes instructions. In one embodiment, the I/O interface 110 responds to instructions or commands received from the processors 106. The operation of the I/O interface 110 in accordance with one embodiment of the present invention, including the manner in which the I/O interfaces 110 interact with the processors 106 and with each other, will be described in a later section.

In system 100, a node 102 may make a portion of its main memory 108 available for sharing with other nodes 102. When a node 102 makes a portion of its main memory 108 available for sharing, it is acting as the home node for that memory portion. If another node 102 wishes to share that memory portion with the home node, that other node 102 mirrors that memory portion in its own main memory 108. In such a case, the other node 102 acts as a sharer node for that memory portion. In one embodiment, a node 102 may make a portion of its main memory 108 available for sharing, and may mirror a portion of main memory 108 made available for sharing by another node 102. Thus, a node 102 may act as both a home node (for the memory portion that it is making available for sharing) and a sharer node (for the memory portion that it is mirroring from another node). An example of this is shown in FIG. 2.

Figure 2:
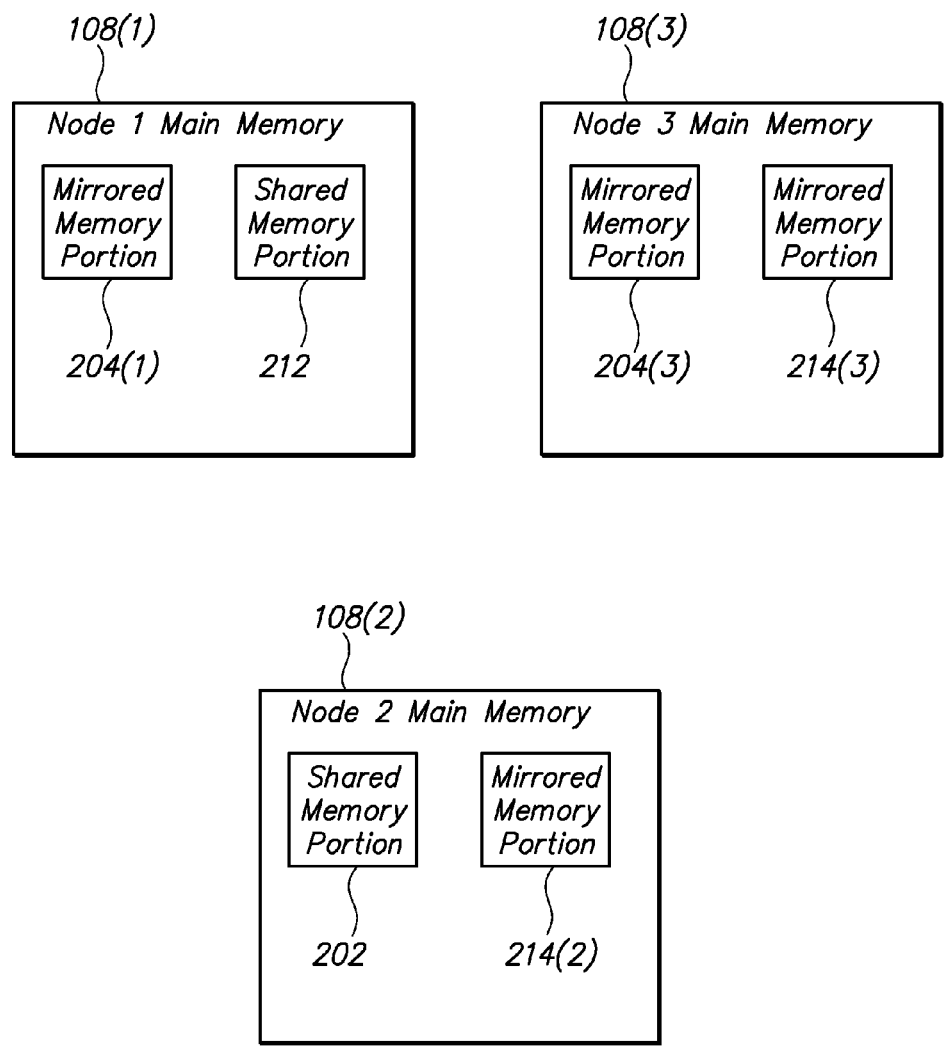
FIG. 2 illustrates an example in which some nodes act as both a home node and a sharer node, in accordance with one embodiment of the present invention.

In FIG. 2, node 2 102(2) is making portion 202 of its main memory 108(2) available for sharing with the other nodes. This shared memory portion 202 is mirrored by nodes 1 and 3; thus, node 1 102(1) has a mirrored memory portion 204(1) in its main memory 108(1) that mirrors shared memory portion 202, and node 3 102(3) has a mirrored memory portion 204(3) in its main memory 108(3) that mirrors shared memory portion 202. In this arrangement, node 2 102(2) is acting as the home node for shared memory portion 202 and nodes 1 and 3 are acting as sharer nodes for shared memory portion 202.

In addition, node 1 102(1) is making portion 212 of its main memory 108(1) available for sharing with the other nodes. This shared memory portion 212 is mirrored by nodes 2 and 3; thus, node 2 102(2) has a mirrored memory portion 214(2) in its main memory 108(2) that mirrors shared memory portion 212, and node 3 102(3) has a mirrored memory portion 214(3) in its main memory 108(3) that mirrors shared memory portion 212. In this arrangement, node 1 102(1) is acting as the home node for shared memory portion 212 and nodes 2 and 3 are acting as sharer nodes for shared memory portion 212. Thus, as this example shows, a node 102 may act as both a home node and a sharer node. For purposes of the present invention, a node 102 may act as a home node for any number (zero or more) of memory portions, and may act as a sharer node for any number (zero or more) of memory portions.

Sample Operation

With the above overview and system description in mind, a sample operation of the system, in accordance with one embodiment of the present invention, will now be described.
Initialization In order to prepare the various nodes 102 in system 100 to share memory, the nodes 102 are initialized. In one embodiment, the nodes 102 may be initialized in the manner described below. A node 102 may act as a home node for one or more memory portions, and/or a sharer node for one or more memory portions, or not participate in memory sharing at all. Depending on what a node 102 decides to do, it may perform some, all, or none of the following operations.
Home Node During initialization, software (e.g. the operating system 114, one or more of the applications 118, etc.) is executed by one or more of the processors 106 on a node 102. Under control of the software, the node 102 determines whether it wishes to make any portion of its main memory 108 available for sharing. If it does, it will act as the home node for that shared memory portion.

In making a portion of its main memory 108 available for sharing, a home node 102 determines a range of virtual addresses that it wishes to share (these virtual addresses will be referred to herein as the shared virtual addresses). The node 102 then allocates sufficient physical memory in its main memory 108 to store data for the entire shared virtual address range. This allocated physical memory will serve as the memory portion of the home node's main memory 108 that the home node 102 is willing to share with other nodes (this memory portion will be referred to herein as the shared memory portion). The shared memory portion comprises a plurality of memory locations. As noted previously, the memory locations may have any desired size. Each memory location has an associated physical address. The shared virtual addresses are mapped to the physical addresses of the memory locations in the shared memory portion, and this mapping is stored in an address translation table. If the memory locations are large enough to contain data for multiple shared virtual addresses, then multiple shared virtual addresses may be mapped to the same physical address with different offsets. For the sake of simplicity, offsets will not be further mentioned below. Each shared virtual address will simply be considered to be mapped to a physical address with the understanding that such mapping may involve the use of an offset.

In addition, the home node 102 allocates physical memory in its main memory 108 for storing a directory structure. This directory structure comprises a directory entry for each one of the memory locations in the shared memory portion. Put another way, each one of the memory locations in the shared memory portion has an associated directory entry in the directory structure. The physical memory allocated for the directory structure comprises one or more memory locations, and each memory location has a physical address. These memory locations are used to store the directory entries; thus, each of the directory entries is mapped to the physical address of one of these memory locations. If a memory location is large enough to store multiple directory entries, then multiple directory entries may be mapped to the same physical address with different offsets. For the sake of simplicity, offsets will not be further mentioned below. Each directory entry will simply be considered to be mapped to a physical address with the understanding that such mapping may involve the use of an offset.

In one embodiment, the directory entry associated with a memory location in the shared memory portion comprises sharing and locking information for that memory location. Specifically, the directory entry has information indicating which node(s) 102 (if any) is/are currently a valid sharer of that memory location in the shared memory portion. As will be discussed further in a later section, this information is used in maintaining memory coherence across the nodes 102. Also, the directory entry indicates whether the directory entry is currently locked. In one embodiment, data may be loaded from or stored to a memory location in the shared memory portion only if the directory entry associated with that memory location is locked. This helps to maintain data integrity. During initialization, each directory entry is initialized to indicate that it is not locked and that there are currently no valid sharers of the memory location in the shared memory portion associated with that directory entry.

Furthermore, the node 102 creates an index structure for all of the shared virtual addresses. This index structure enables information pertaining to the shared virtual addresses to be accessed quickly and easily. In one embodiment, for each of the shared virtual addresses that a home node 102 is making available for sharing, the index structure includes information indicating the physical address of the memory location in the home node's main memory 108 where the directory entry associated with that shared virtual address is stored (note: each directory entry is associated with a memory location in the shared memory portion and each shared virtual address maps to one of the memory locations in the shared memory portion; thus, each shared virtual address is associated with one of the directory entries). Additional information may be added to this index structure at a later time, as will be described below.

After the above operations are performed, the home node 102 broadcasts information to inform the other nodes 102 of its willingness to share a portion of its main memory. As part of this broadcast, the home node 102 may provide its node identifier and the address range of the shared virtual addresses. In addition, it may provide, for each of the shared virtual addresses: (a) the physical address of the memory location in the shared memory portion of the home node's main memory 108 to which the shared virtual address is mapped; and (b) the physical address of the memory location in the home node's main memory 108 where the directory entry associated with the shared virtual address is stored. This information will be used by one or more sharer nodes 102 to mirror the shared memory portion of the home node's main memory 108 in its own main memory.

Sharer Node

During initialization, under software control, a node 102 may receive information broadcasted by a home node indicating a willingness to share a portion of the home node's main memory. In response to this information, the node 102 may decide to share or not share that portion of the home node's main memory. If the node 102 decides to share that portion of the home node's main memory, then it will act as a sharer node for that shared memory portion.

To share the shared memory portion of the home node's main memory, a sharer node 102 takes note of the address range of the shared virtual addresses broadcasted by the home node. The sharer node 102 may choose to use the same virtual addresses as the shared virtual addresses, or use a different set of virtual addresses that map to the shared virtual addresses. In the following discussion, for the sake of example, it will be assumed that the sharer node 102 uses the same virtual addresses as the shared virtual addresses broadcasted by the home node.

The sharer node 102 allocates sufficient physical memory in its main memory 108 to store data for the entire shared virtual address range. This allocated physical memory will serve as the memory portion of the sharer node's main memory 108 that is used to mirror the shared memory portion of the home node's main memory (this memory portion of the sharer node's main memory will be referred to herein as the mirrored memory portion). The mirrored memory portion comprises a plurality of memory locations. In one embodiment, these memory locations are the same size as the memory locations in the shared memory portion of the home node's main memory. Each memory location has an associated physical address. The shared virtual addresses are mapped to the physical addresses of the memory locations in the mirrored memory portion, and this mapping is stored in an address translation table. If the memory locations are large enough to contain data for multiple shared virtual addresses, then multiple shared virtual addresses may be mapped to the same physical address with different offsets. For the sake of simplicity, offsets will not be further mentioned below. Each shared virtual address will simply be considered to be mapped to a physical address with the understanding that such mapping may involve the use of an offset.

In one embodiment, each of the memory locations in the mirrored memory portion is initialized to indicate that it has invalid data. This may be done, for example, by storing a predetermined special data value into each of the memory locations in the mirrored memory portion. This special data value may be any desired data value, and is used to indicate invalid data. In one embodiment, the same special data value is used throughout the entire distributed node system 100 by all of the nodes 102 to indicate invalid data. However, it should be noted that this is not required. If so desired, each node 102 may use a different special data value to indicate invalid data.

In one embodiment, the sharer node 102 also allocates some physical memory in its main memory 108 for a store buffer. As will be discussed further in a later section, this store buffer is used to store data updates that are intended to be stored in memory locations in the shared memory portion of the home node but which have not been propagated to the home node yet.

In addition, the sharer node 102 creates an index structure for all of the shared virtual addresses. This index structure enables information pertaining to the shared virtual addresses to be accessed quickly and easily. In one embodiment, for each of the shared virtual addresses, the index structure includes: (a) an indication of which node is the home node for that shared virtual address; (b) the physical address of the memory location in the shared memory portion of the home node's main memory to which the shared virtual address is mapped; and (c) the physical address of the memory location in the home node's main memory where the directory entry associated with the shared virtual address is stored. All of this information was previously broadcasted by the home node. Additional information may be added to this index structures at a later time, as will be described below.

Furthermore, the sharer node 102 broadcasts information to the other nodes to inform the other nodes that it is now sharing the shared memory portion of the home node's main memory. As part of this broadcast, the sharer node 102 may provide its node identifier. In addition, the sharer node 102 may provide, for each of the shared virtual addresses that it is sharing with the home node, the physical address of the memory location in the sharer node's mirrored memory portion to which the shared virtual address is mapped. This information will be used by the home node and other sharer nodes to update their index structure for the shared virtual addresses, as will be described below.

Home Node and Sharer Node

Under software control, a node 102, whether it is acting as a home node or a sharer node, listens to information broadcasted by another node indicating that the other node is sharing certain virtual addresses with a home node. Using this information, the node 102 updates the index structure that it previously created for the shared virtual addresses.

For example, suppose that a home node has made a shared virtual address SVA1 available for sharing. Suppose a sharer node broadcasts that it is sharing this virtual address. Included in this broadcast are the node identifier of the sharer node and the physical address of the memory location in the mirrored memory portion of the sharer node's main memory to which the shared virtual address is mapped. With this information, the home node now knows that the sharer node is sharing SVA1, and the home node also knows the physical address of the memory location in the sharer node's mirrored memory portion where data for SVA1 is stored. The home node updates its index structure for the shared virtual addresses with this information for SVA1.

Similarly, suppose that a sharer node is sharing a shared virtual address SVA1 made available for sharing by a home node. Suppose further that another sharer node broadcasts that it is also sharing this virtual address. Included in this broadcast are the node identifier of the other sharer node and the physical address of the memory location in the mirrored memory portion of the other sharer node's main memory to which the shared virtual address is mapped. With this information, the first sharer node now knows that the other sharer node is also sharing SVA1, and the first sharer node also knows the physical address of the memory location in the other sharer node's mirrored memory portion where data for SVA1 is stored. The first sharer node updates its index structure for the shared virtual addresses with this information for SVA1.

EXAMPLE

Figure 3:
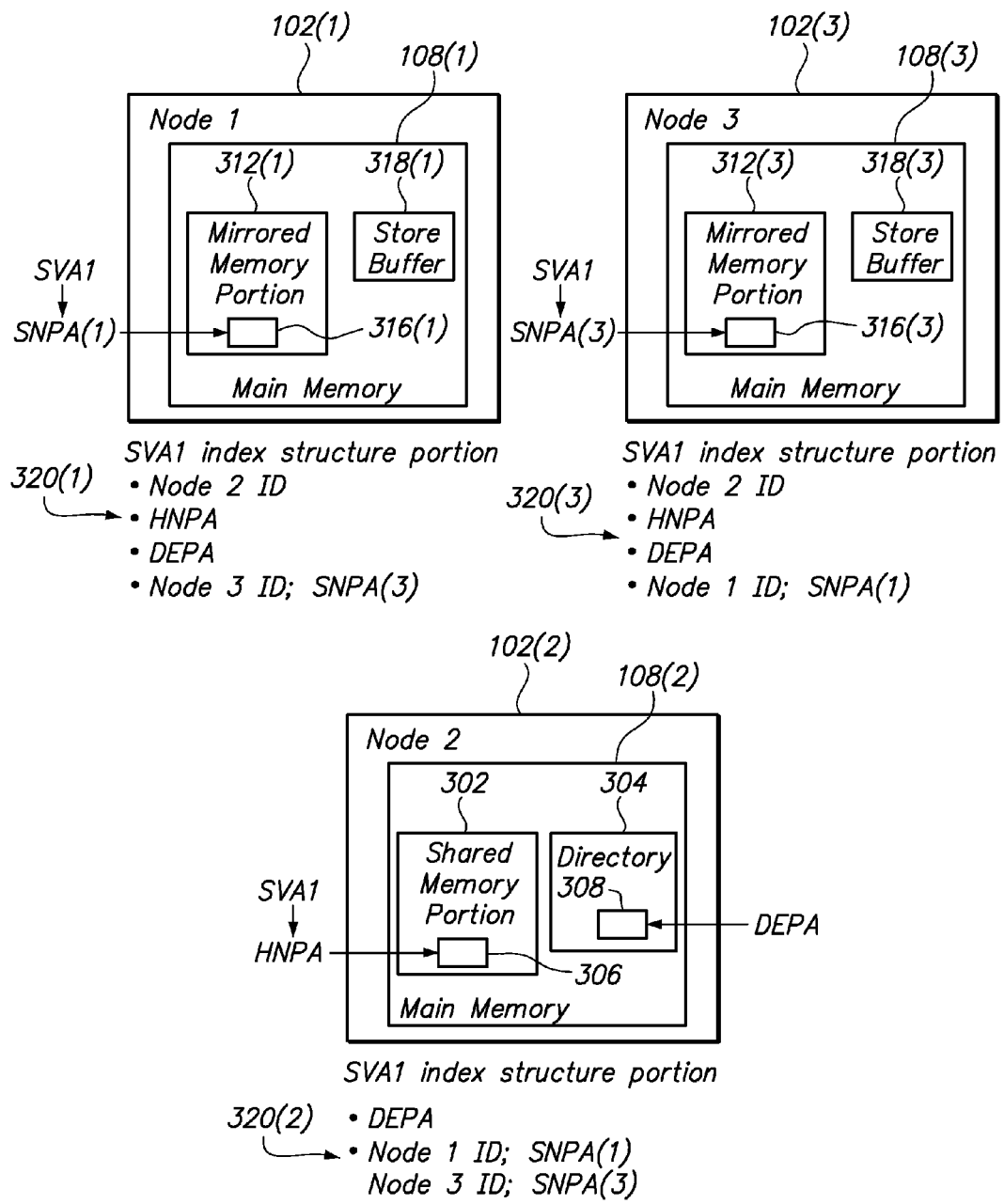
FIG. 3 illustrates an example of the memory structures and index structures that may be created during an initialization process, in accordance with one embodiment of the present invention.

To illustrate a sample result of the initialization process, reference will now be made to the example shown in FIG. 3. In FIG. 3, node 2 102(2) acts as a home node and nodes 1 and 3 102(1), 102(3) act as sharer nodes. Acting as the home node, node 2 102(2) makes a shared memory portion 302 of its main memory 108(2) available for sharing. Node 2 102(2) also has a directory structure 304 in its main memory 108(2) that contains a directory entry for each of the memory locations in the shared memory portion 302. Acting as a sharer node, node 1 102(1) has a mirrored memory portion 312(1) in its main memory 108(1) that mirrors the shared memory portion 302 of node 2 102(2). Node 1 102(1) also has a store buffer 318(1) in its main memory 108(1) for storing updated data that is intended to be stored in memory locations in the shared memory portion 302 of node 2 102(2) but which have not been propagated yet to node 2 102(1). Similarly, acting as a sharer node, node 3 102(3) has a mirrored memory portion 312(3) in its main memory 108(3) that mirrors the shared memory portion 302 of node 2 102(2). Node 3 102(3) also has a store buffer 318(3) in its main memory 108(3) for storing updated data that is intended to be stored in memory locations in the shared memory portion 302 of node 2 102(2) but which have not been propagated yet to node 2 102(1).

The shared memory portion 302 of node 2 102(2) includes a memory location 306. This memory location 306 has a physical address HNPA, which maps to shared virtual address SVA1. This memory location 306 has an associated directory entry 308 in the directory structure 304. This directory entry 308 has a physical address DEPA.

The memory location 306 has a corresponding memory location 316(1) in the mirrored memory portion 312(1) of sharer node 1 102(1). The corresponding memory location 316(1) has a physical address SNPA(1), and this physical address SNPA(1) also maps to shared virtual address SVA1. Thus, in this example, shared virtual address SVA1 is common to both memory locations 306 and 316(1). Memory location 306 also has a corresponding memory location 316(3) in the mirrored memory portion 312(3) of sharer node 3 102(3). The corresponding memory location 316(3) has a physical address SNPA(3) 102(3), and this physical address SNPA(3) maps to shared virtual address SVA1. Thus, in this example, shared virtual address SVA1 is again common to both memory locations 306 and 316(3).

As noted previously, each node 102 creates an index structure for all of the shared virtual addresses. FIG. 3 shows the portions of the index structures that may be created by the various nodes 102 for shared virtual address SVA1. Similar index structure portions may be created for each of the other shared virtual addresses. For home node 2 102(2), the index structure portion 320(2) for SVA1 may include the physical address DEPA of the directory entry 308 that is associated with the memory location 306 to which SVA1 is mapped. The index structure portion 302(2) may also include information on the nodes that are sharing SVA1. Since node 1 102(1) and node 3 102(3) are sharing SVA1 in the current example, the index structure portion 302(2) may include the node identifier of node 1 102(1), and the physical address SNPA(1) of the memory location 316(1) on node 1 102(1) to which SVA1 is mapped. The index structure portion 302(2) may also include the node identifier of node 3 102(3), and the physical address SNPA(3) of the memory location 316(3) on node 3 102(3) to which SVA1 is mapped. This information was broadcasted by node 1 102(1) and node 3 102(3) when they decided to share the shared memory portion 302 of node 2 102(2).

For sharer node 1 102(1), the index structure portion 320(1) for SVA1 may include information pertaining to the home node 102(2). This information may include the node identifier of node 2 102(2) to indicate that node 2 is the home node for SVA1. This information may also include the physical address HNPA of the memory location 306 on the home node 2 102(2) to which SVA1 is mapped. This information may further include the physical address DEPA of the directory entry 308 on the home node 2 102(2) that is associated with the memory location 306 to which SVA1 is mapped. All of this information was broadcasted by the home node 2 102(2) when it decided to make the shared memory portion 302 available for sharing. In addition, the index structure portion 320(1) for SVA1 may include information about other sharing nodes. Since node 3 102(3) is also sharing SVA1, index structure portion 302(1) may include the node identifier of node 3 102(3), and the physical address SNPA(3) of the memory location 316(3) on node 3 102(3) to which SVA1 is mapped. This information was broadcasted by node 3 102(3) when it decided to share the shared memory portion 302 of node 2 102(2).

To complete the example, for sharer node 3 102(3), the index structure portion 320(3) for SVA1 may include information pertaining to the home node 102(2). This information may include the node identifier of node 2 102(2) to indicate that node 2 is the home node for SVA1. This information may also include the physical address HNPA of the memory location 306 on the home node 2 102(2) to which SVA1 is mapped. This information may further include the physical address DEPA of the directory entry 308 on the home node 2 102(2) that is associated with the memory location 306 to which SVA1 is mapped. All of this information was broadcasted by the home node 2 102(2) when it decided to make the shared memory portion 302 available for sharing. In addition, the index structure portion 320(3) for SVA1 may include information about other sharing nodes. Since node 1 102(1) is also sharing SVA1, index structure portion 302(3) may include the node identifier of node 1 102(1), and the physical address SNPA(1) of the memory location 316(1) on node 1 102(1) to which SVA1 is mapped. This information was broadcasted by node 1 102(1) when it decided to share the shared memory portion 302 of node 2 102(2).

Regular Operation

The above discussion describes how the nodes 102 in system 100 may be initialized, in accordance with one embodiment of the present invention. After the nodes 102 are initialized, they are ready to implement the memory sharing and memory coherence protocol described below. In the following description, operation will be described separately for a sharer node and a home node. The operations performed by a node will depend on whether that node is acting as a home node or a sharer node when it is loading data from or storing data to a memory location. To provide some context for discussion, reference will be made below to the system diagram shown in FIG. 1 and the example shown in FIG. 3. For purposes of the following discussion, it will be assumed that node 1 102(1) is the sharer node on which load and store operations are performed, and that node 2 102(2) is the home node. Node 3 102(3) will be assumed to be an additional sharer node.

Sharer Node Load

During regular operation, at least one of the processors 106(1) (see FIG. 1) on sharer node 1 102(1) executes a set of program instructions (e.g. operating system 114(1), one of the applications 118(1), etc.) pertaining to a particular thread of execution. While executing this set of program instructions, the processor 106(1) may load data (block 404 of the flowchart shown in FIG. 4) from a particular memory location in node 1's main memory 108(1). For purposes of the following discussion, it will be assumed that data is loaded from the memory location 316(1) (FIG. 3) in the mirrored portion 312(1) of node 1's main memory 108(1), to which the shared virtual address SVA1 is mapped.

In one embodiment, to ensure that data coherence is maintained, the processor 106(1) does not immediately use the loaded data. Rather, the processor 106(1) first performs a check to determine whether the loaded data is valid. In one embodiment, the processor 106(1) performs this check by determining (block 408 of FIG. 4) whether the loaded data has a data value that is the same as a predetermined special data value. As noted previously, the special data value is used to indicate invalid data. If the loaded data value is not the same as the special data value (thereby indicating that the loaded data is valid), then the processor 106(1) may use (block 412 of FIG. 4) the loaded data for further processing. However, if the loaded data value is the same as the special data value (thereby indicating that the loaded data is invalid), then the processor 106(1) obtains a local lock (block 416 of FIG. 4) on the memory location 316(1).

After the local lock is obtained, the processor 106(1), in one embodiment, loads data (block 420 of FIG. 4) again from memory location 316(1), and determines again (block 424 of FIG. 4) whether the loaded data has a data value that is the same as the special data value. The processor 106(1) performs this second load and check because, between the time the first check was performed and the time the local lock was obtained, valid data may have been stored into the memory location 316(1) by another strand, thread, or processor. If the loaded data value is not the same as the special data value (thereby indicating that valid data was indeed stored into the memory location 316(1) by another strand, thread, or processor), then the processor 106(1) may use (block 412 of FIG. 4) the loaded data for further processing. However, if the loaded data value is again the same as the special data value (thereby indicating that the loaded data is still invalid), then the processor 106(1) proceeds to obtain (block 428 of FIG. 4) valid data for the memory location 316(1) from the home node 102(2). In one embodiment, the processor 106(1) does so in the following manner.

Initially, the processor 106(1) accesses the index structure portion 320(1) (FIG. 3) for the shared virtual address SVA1 to which the memory location 316(1) is mapped. Given this index structure portion 320(1), the processor 106(1) knows that: (a) node 2 102(2) is the home node for SVA1; (b) HNPA is the physical address of the memory location 306 in the home node's main memory that corresponds to memory location 316(1); and (c) DEPA is the physical address in the main memory 108(2) of the home node 102(2) where the directory entry 308 associated with the corresponding memory location 306 is stored.

In one embodiment, the processor 106(1) sends one or more instructions to the I/O interface 110(1) (FIG. 1) on node 1 102(1) to cause the I/O interface 110(1) to lock the directory entry 308 on node 2 102(2), obtain the valid data stored in the corresponding memory location 306 on node 2 102(2), and store the valid data into an interim memory location (not shown) in the main memory 108(1) on node 1 102(1). As part of the one or more instructions, the processor 106(1) may provide to the I/O interface 110(1) the node identifier of node 2 102(2), the physical address DEPA of the directory entry 308 on node 2 102(2), the physical address HNPA of the corresponding memory location 306 on node 2 102(2), and the physical address of the interim memory location on node 1 102(1).

In response to the one or more instructions, the I/O interface 110(1) communicates and interacts with the I/O interface 110(2) on node 2 102(2) to cause the I/O interface 110(2) on node 2 102(2) to access and lock the directory entry 308, access the corresponding memory location 306, and provide a copy of the valid data stored in the corresponding memory location 306 to I/O interface 110(1). As part of this interaction, the I/O interface 110(1) may provide to I/O interface 110(2) the physical address DEPA of the directory entry 308 and the physical address HNPA of the corresponding memory location 306. The I/O interface 110(1) on node 1 102(1) thereafter stores the valid data obtained from the I/O interface 110(2) into the interim memory location on node 1 102(1).

After the valid data is obtained and stored into the interim memory location, the processor 106(1), in one embodiment, checks the contents of the store buffer 318(1) on node 1 102(1) to determine (block 432 of FIG. 4) whether the store buffer 318(1) contains any updated data that is intended to be stored in the corresponding memory location 306 of the home node 102(2) but which has not been propagated yet to the home node 102(2). The processor 106(1) may do so, for example, by looking for entries in the store buffer 318(1) that indicate that the updated data in that entry is destined for SVA1. If the store buffer 318(1) does not contain any such updated data for the corresponding memory location 306, then the processor 106(1) stores (block 436 of FIG. 4) the valid data in the interim memory location into memory location 316(1). However, if the store buffer 318(1) does contain updated data for the corresponding memory location 306, then the processor 106(1) updates (block 440 of FIG. 4) the valid data in the interim memory location with the updated data from the store buffer 318(1) to derive a set of modified valid data. The processor 106(1) then stores (block 444 of FIG. 4) the modified valid data in the interim memory location into memory location 316(1) (note: the updated data remains in the store buffer 318(1) so that it will eventually be propagated to the home node 102(2)). By doing this, the processor 106(1) causes the data in memory location 316(1) to reflect both the valid data from the home node 102(2) and the updated data from the store buffer 318(1).

Thereafter, the processor 106(1) causes (block 448 of FIG. 4) the directory entry 308 to be updated and unlocked. The processor 106(1) may do so by sending one or more instructions to the I/O interface 110(1) to cause the I/O interface 110(1) to update the directory entry to indicate that node 1 102(1) is now a valid sharer of corresponding memory location 306, and to unlock the directory entry 308. As part of the one or more instructions, the processor 106(1) may provide to the I/O interface 110(1) the node identifier of node 2 102(2) and the physical address DEPA of the directory entry 308 on node 2 102(2). In response to the one or more instructions, the I/O interface 110(1) communicates and interacts with the I/O interface 110(2) on node 2 102(2) to cause the I/O interface 110(2) on node 2 102(2) to access the directory entry 308, update the contents therein to indicate that node 1 102(1) is now a valid sharer of corresponding memory location 306, and unlock the directory entry 308. As part of this interaction, the I/O interface 110(1) may provide to the I/O interface 110(2) on node 2 102(2) the physical address DEPA of the directory entry 308.

After sending the one or more instructions to the I/O interface 110(1) to cause the I/O interface 110(1) to update and unlock the directory entry 308 (in one embodiment, the processor 106(1) does not wait for the I/O interface 110(1) to interact with I/O interface 110(2)), the processor 106(1) releases (block 452 of FIG. 4) the local lock on memory location 316(1). Thereafter, the processor 106(1) may use (block 412 of FIG. 4) the valid data (or the modified valid data) that was stored into memory location 316(1) for further processing. In the manner described, a sharer node may load data from a memory location that is within a mirrored memory portion of the sharer node's main memory, in accordance with one embodiment of the present invention.

In very rare instances, the particular memory location from which data is being loaded may contain valid data that just happens to have the same data value as the special data value. If this occurs, the processor 106(1) of the sharer node 102(1) will treat the valid data as invalid data (referred to herein as a "false miss"), and will operate in the manner described above. The end result will be that the valid data, having the special data value, will be obtained from the home node 102(2) and will be stored again (unless it is updated with updated data from the store buffer 318(1)) into the particular memory location. This false miss process will be implemented each time data is loaded from the particular memory location until the valid data is changed to some other value. While this false miss process may make loading data from the particular memory location less efficient, it should occur so rarely that its impact on system performance should be negligible.

Alternative Embodiment(s)

In the embodiment described above, the processor 106(1) causes valid data for memory location 316(1) to be obtained from corresponding memory location 306 first, and then updates the valid data with the updated data from the store buffer 318(1). As an alternative, the processor 106(1) may obtain the updated data from the store buffer 318(1) and propagate it to memory location 306 of node 2 102(1) first, and then obtain the valid data from memory location 306 (the manner in which updated data may be propagated to the home node 102(2) will be described in a later section). With this approach, the valid data obtained from memory location 306 will already reflect the updated data from the store buffer 318(1); thus, there is no need for the processor 106(1) to perform any updates to the valid data.

Figure 4:
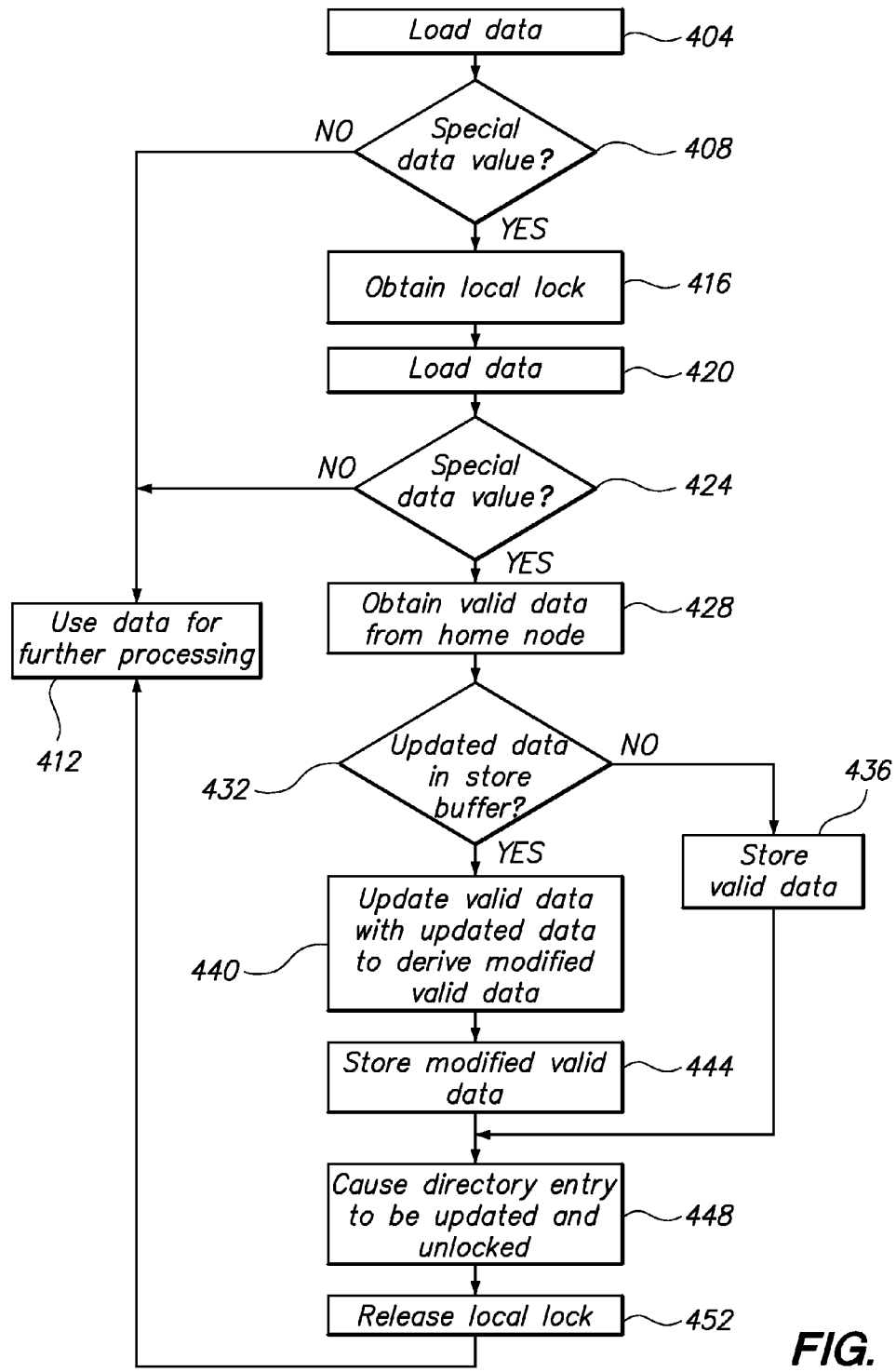
FIG. 4 shows an operational flow diagram illustrating the operations performed by a sharer node in loading data from a memory location, in accordance with one embodiment of the present invention.

Also, in the embodiment described above, the processor 106(1) performs all or a portion of the operations shown in blocks 414 through 424 of FIG. 4. As an alternative, these operations may be performed in whole or in part by the I/O interface 110(1) instead. With such an alternative arrangement, the processor 106(1) may simply send one or more instructions to the I/O interface 110(1) to ask the I/O interface 110(1) to obtain valid data from the corresponding memory location 306 of node 2 102(2). In response, the I/O interface 110(1) will: (a) interact with the I/O interface 110(2) on the home node 102(2) to access and lock the directory entry 308, and obtain the valid data from memory location 306; (b) store the valid data into the interim memory location; (c) check the store buffer 318(1) for updated data destined for memory location 306; (d) store the valid data into memory location 316(1) if no updated data destined for memory location 306 is found in the store buffer 318(1); (e) update the valid data with updated data to derive a set of modified valid data, if updated data destined for memory location 306 is found in the store buffer 318(1); (f) store the modified valid data (if any) into memory location 316(1); and (g) interact with the I/O interface 110(2) on the home node 102(2) to update and unlock the directory entry 308. This alternative arrangement relieves much of the burden from processor 106(1).

These and other alternative approaches are within the scope of the present invention.

Sharer Node Store

During regular operation, one or more processors 106(1) on sharer node 1 102(1) may execute a set of program instructions (e.g. operating system 114(1), one or more of the applications 118(1), etc.) pertaining to a particular thread of execution. While executing this set of program instructions, the processor 106(1) may wish to store a set of updated data into a particular memory location that is within the mirrored memory portion 312(1) of node 1's main memory 108(1). For purposes of the following discussion, it will be assumed that the store operation targets memory location 316(1), to which the shared virtual address SVA1 is mapped.

Figure 5:
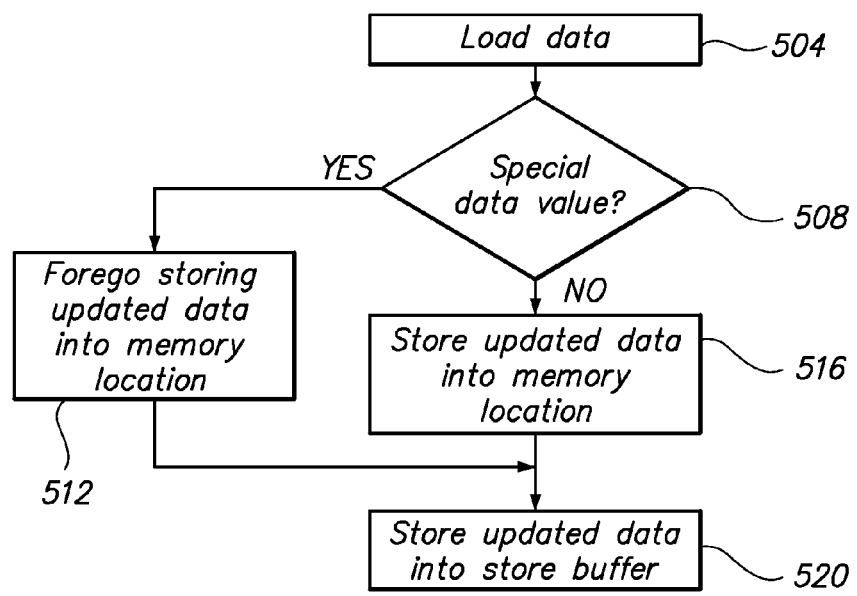
FIG. 5 shows an operational flow diagram illustrating the operations performed by a sharer node in storing data to a memory location, in accordance with one embodiment of the present invention.

In one embodiment, before storing the updated data into memory location 316(1), the processor 106(1) first performs a check to determine whether the data currently stored in memory location 316(1) is valid. The processor 106(1) may do so by loading data (block 504 of FIG. 5) from the memory location 316(1), and determining (block 508 of FIG. 5) whether the loaded data has the same data value as a predetermined special data value (which is used to indicate invalid data). If the loaded data value is not the same as the special data value (thereby indicating that the loaded data is valid), then the processor 106(1) stores (block 516 of FIG. 5) the updated data into memory location 316(1). However, if the loaded data value is the same as the special data value (thereby indicating that the loaded data is invalid), then the processor 106(1) foregoes (block 512 of FIG. 5) storing the updated data into memory location 316(1). By not storing the updated data into memory location 316(1) when the loaded data is invalid, the processor 106(1) prevents invalid data from being transformed into data that appears to be valid, which would jeopardize data coherency.

In addition, the processor 106(1) stores (block 520 of FIG. 5) the updated data into the store buffer 318(1) on node 1 102(1) to cause the updated data to eventually be propagated to node 2 102(2) and stored into corresponding memory location 306. In one embodiment, the processor 106(1) stores the updated data into store buffer 318(1) by initially determining whether the store buffer 318(1) currently contains any existing updated data that is destined for memory location 306 on node 2 102(1) (the processor 106(1) may make this determination, for example, by looking for an entry in the store buffer 318(1) that has SVA1 associated therewith). If such an entry is found, then the processor 106(1) locks the entry, merges the new updated data with the existing updated data in the entry to give rise to a set of merged updated data, and unlocks the entry. On the other hand, if the store buffer 318(1) does not currently contain any existing updated data destined for memory location 306 of node 2 102(2), then the processor 106(1) adds an entry to the store buffer 318(1). This entry may include the updated data, an indication that the updated data is destined for memory location 306 of node 2 102(2) (this indication may include, for example, SVA1), and optionally a thread identifier for the particular thread that contained the store operation. This thread identifier allows all entries in the store buffer 318(1) that are associated with a certain thread to be easily identified. After the updated data is stored into the store buffer 318(1), the store operation is complete, and the processor 106(1) may continue operation in accordance with the program instructions pertaining to the particular thread of execution.

Update Propagation

The above discussion describes the operations that are performed to store the updated data into the store buffer 318(1) and possibly into the memory location 316(1). These operations are only part of the data update process. To complete the process, the updated data that is stored into the store buffer 318(1) is, at some point, propagated to the home node 102(2). In one embodiment, this is achieved by having one or more processors 106(1) on the sharer node 1 102(1) execute a set of update propagation instructions. These update propagation instructions may be part of the program instructions that caused the updated data to be stored into the store buffer 318(1), or they may be part of a separate set of program instructions. The update propagation instructions may be executed as part of the same thread as the store operation that caused the updated data to be stored into the store buffer 318(1), or as part of a different thread. The processor 106(1) that executes the update propagation instructions may be the same processor 106(1) that executed the instructions that caused the updated data to be stored into the store buffer 318(1), or it may be a different processor. These and other possibilities are within the scope of the present invention. In the following discussion, it will be assumed for the sake of example that the update propagation instructions are executed by one of the processors 106(1) on node 1 102(1), which may or may not be the same processor 106(1) that executed the instructions that caused the updated data to be stored into the store buffer 318(1).

While executing the update propagation instructions, the processor 106(1) may perform the following operations. Initially, the processor 106(1) selects one of the entries in the store buffer 318(1). This selection may be made, for example, randomly, sequentially, based upon a certain order (e.g. first in first out, last in first out, etc.), based upon the thread identifier stored in the entry, or based upon any other desired criteria. For the sake of example, it will be assumed that the selected entry is the one that contains the updated data from the previously discussed store operation that is destined for memory location 306 on node 2 102(2). In one embodiment, the processor 106(1) locks the selected entry and retrieves (block 604 of the flowchart shown in FIG. 6) the information stored in the entry, which may include the updated data and an indication that the updated data is destined for memory location 306 on node 2 102(2) (this indication may include, for example, SVA1).

The processor 106(1) may then access the index structure portion 320(1) for SVA1. From the information in this index structure portion 320(1), the processor 106(1) knows that: (a) node 2 102(2) is the home node for SVA1; (b) HNPA is the physical address of the memory location 306 in the home node's main memory 108(2) that is the intended destination for the updated data; and (c) DEPA is the physical address in the main memory 108(2) of the home node 102(2) where the directory entry 308 associated with the memory location 306 is stored.

Using this information, the processor 106(1) causes (block 608 of FIG. 6) the directory entry 308 to be locked and the contents contained therein to be obtained. In one embodiment, the processor 106(1) does so by sending one or more instructions to the I/O interface 110(1) on node 1 102(1) to cause the I/O interface 110(1) to lock the directory entry 308 on node 2 102(2) and to obtain the contents stored therein. As part of the one or more instructions, the processor 106(1) may provide to the I/O interface 110(1) the node identifier of node 2 102(2) and the physical address DEPA of the directory entry 308 on node 2 102(2). In response to the one or more instructions, the I/O interface 110(1) communicates and interacts with the I/O interface 110(2) on node 2 102(2) to cause the I/O interface 110(2) on node 2 102(2) to access the directory entry 308, lock the directory entry 308, and provide a copy of the contents of the directory entry 308 to I/O interface 110(1). As part of this interaction, the I/O interface 110(1) may provide to I/O interface 110(2) the physical address DEPA of the directory entry 308. The I/O interface 110(1) on node 1 102(1) thereafter makes the contents of the directory entry 308 available to processor 106(1).

As noted previously, a directory entry 308 comprises sharing information for the memory location 306 with which it is associated. This sharing information indicates which node/nodes (if any) is/are currently a valid sharer of that memory location 306. For the sake of example, it will be assumed that the directory entry 308 indicates that node 3 102(3) is currently a valid sharer of memory location 306. This means that node 3 102(3) has a mirrored memory location 316(3) in its main memory 108(3) that mirrors memory location 306, and that the mirrored memory location 316(3) on node 3 102(3) currently contains valid data. Because data in memory location 306 of the home node 102(2) is about to be updated, the data in mirrored memory location 316(3) of node 3 102(3) is about to be made invalid. To prevent node 3 102(3) from using invalid data, the processor 106(1), in one embodiment, causes (block 612 of FIG. 6) the data in mirrored memory location 316(3) of node 3 102(3) to be invalidated.

The processor 106(1) may do so by obtaining, from the index structure portion 320(1), the node identifier of node 3 102(3) and the physical address SNPA(3) of the mirrored memory location 316(3) on node 3 102(3). The processor 106(1) may then send one or more instructions to the I/O interface 110(1) of node 1 102(1) to cause the I/O interface 110(1) to invalidate the data in memory location 316(3) of node 3 102(3). As part of the one or more instructions, the processor 106(1) may provide to the I/O interface 110(1) the node identifier of node 3 102(3), the physical address SNPA(3) of the memory location 316(3) on node 3 102(3), and a special data value that is used by node 3 102(3) to indicate invalid data (recall from previous discussion that different nodes may use difference special data values to indicate invalid data; thus, this special data value may be the same special data value as that used by node 1 102(1), or it may be a different special data value).

In response to the one or more instructions, the I/O interface 110(1) communicates and interacts with the I/O interface 110(3) on node 3 102(3) to cause the I/O interface 110(3) on node 3 102(3) to store the special data value into memory location 316(3) to, in effect, invalidate the data stored in memory location 316(3). As part of this interaction, the I/O interface 110(1) may provide to the I/O interface 110(3) on node 3 102(3) the physical address SNPA(3) of the memory location 316(3) and the special data value.

The processor 106(1) may repeat the above invalidation process for each of the sharer nodes indicated by the directory entry 308 as being a valid sharer of memory location 306. After that is done, the processor 106(1) may update (block 616 of FIG. 6) its copy of the directory entry 308 such that the directory entry 308 no longer indicates any sharer nodes (other than perhaps sharer node 1 102(2)) as being a valid sharer of memory location 306.

In addition to the above operations, the processor 106(1) causes (block 620 of FIG. 6) the updated data for memory location 306 to be propagated to node 2 102(2), and the directory entry 308 to be updated and unlocked. The processor 106(1) may do so by sending one or more instructions to the I/O interface 110(1) to cause the I/O interface 110(1) to store the updated data into memory location 306 of node 2 102(2), and to update and unlock the directory entry 308 on node 2 102(2). As part of the one or more instructions, the processor 106(1) may provide to the I/O interface 110(1) the node identifier of node 2 102(2), the physical address HNPA of the memory location 306 on node 2 102(2), the updated data to be stored into memory location 306, the physical address DEPA of the directory entry 308 on node 2 102(2), and the updated contents for the directory entry 308.

In response to the one or more instructions, the I/O interface 110(1) communicates and interacts with the I/O interface 110(2) on node 2 102(2) to cause the I/O interface 110(2) on node 2 102(2) to access memory location 306, store the updated data into memory location 306, access the directory entry 308, update the contents of the directory entry 308, and unlock the directory entry 308. As part of this interaction, the I/O interface 110(1) may provide to the I/O interface 110(2) on node 2 102(2) the physical address HNPA of memory location 306, the updated data for memory location 306, the physical address DEPA of the directory entry 308, and the updated contents for the directory entry 308.

After the updated data is propagated to the home node 2 102(2), the processor 106(1) removes (block 624 of FIG. 6) the selected entry from the store buffer 318(1). The processor 106(1) may then loop back to block 604 to select another entry from the store buffer 318(1) and to repeat the above process. In the manner described, updated data may be propagated from a sharer node to a home node, in accordance with one embodiment of the present invention.

Alternative Embodiment(s)

Figure 6:
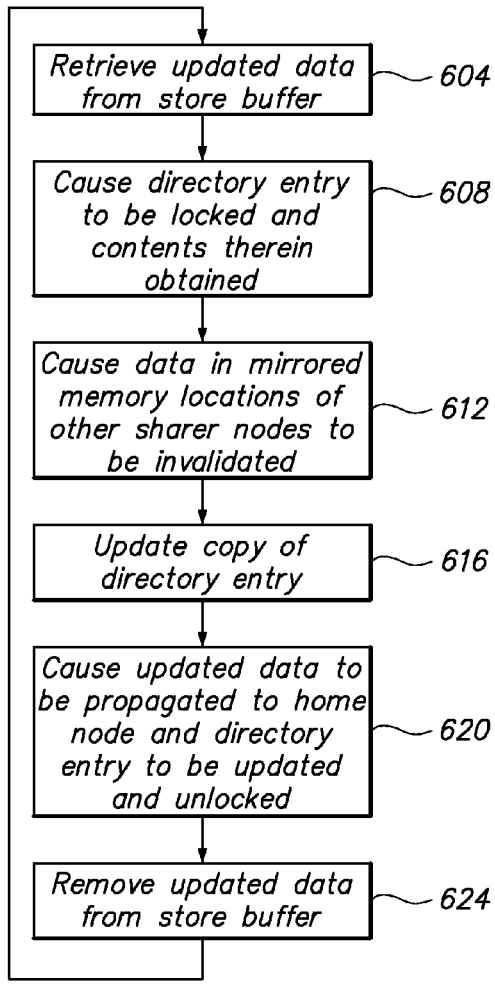
FIG. 6 shows an operational flow diagram illustrating the operations performed by a sharer node in propagating updated data to a home node, in accordance with one embodiment of the present invention.

In the embodiment described above, the processor 106(1) participates in the operations shown in blocks 608 through 620 of FIG. 6. As an alternative, these operations may be performed completely by the I/O interface 110(1) instead. With such an arrangement, the processor 106(1) may simply retrieve updated data from an entry in the store buffer 318(1), and send one or more instructions to the I/O interface 110(1) to ask the I/O interface 110(1) to propagate the updated data to the home node 102(2). In response, the I/O interface 110(1) will, without further input from the processor 106(1): (a) interact with the I/O interface 110(2) on the home node 102(2) to access and lock the directory entry 308, and obtain the contents of the directory entry 308; (b) determine from the contents of the directory entry 308 that node 3 102(3) is currently a valid shared of memory location 306); (c) interact with the I/O interface 110(3) on node 3 102(3) to store the special data value into the mirrored memory location 316(3) of node 3 102(3) to invalidate the data stored therein; (d) update the copy of the contents of the directory entry 308 such that the directory entry 308 no longer indicates any sharer nodes (other than perhaps sharer node 1 102(1)) as being valid sharers of memory location 306; and (e) interact with the I/O interface 110(2) on the home node 102(2) to store the updated data into the memory location 306, store the updated directory entry contents into the directory entry 308, and unlock the directory entry 308. With this alternative arrangement, much of the data propagation burden is removed from the processor 106(1).

As yet another alternative, all of the operations shown in FIG. 6 may be performed by the I/O interface 110(1) with no participation from the processor 106(1), which means that it would be the I/O interface 110(1) that retrieves updated data from the store buffer 318(1), propagates the updated data to the home node 102(2), and removes the updated data from the store buffer 318(1). In this arrangement, the I/O interface 110(1) may provide some functionality that allows a processor 106(1) to inquire as to whether a set of updated data has been propagated yet to the home node. With this functionality, the processor 106(1) will be able to get confirmation that a store operation has been completed so that it can move on with other operations.

In the embodiment described above, it is the sharer node 102(1) that causes the data in the mirrored memory locations of the other sharer nodes to be invalidated. As an alternative, this invalidation may be performed by the home node 102(2)

instead. Under such an arrangement, a processor 106(1) on the sharer node 102(1) may retrieve updated data (e.g. the updated data destined for corresponding memory location 306 on node 2 102(2)) from an entry in the store buffer 318(1), and send one or more instructions to the I/O interface 110(1) to ask the I/O interface 110(1) to propagate the updated data to the home node 102(2). As part of the one or more instructions, the processor 106(1) may provide to the I/O interface 110(1) the updated data, the node identifier of node 2 102(2), the physical address HNPA of the corresponding memory location 306 on node 2 102(2) into which the updated data is to be stored, and the physical address DEPA of the directory entry 308 on node 2 102(2) that is associated with the corresponding memory location 306. In response to the one or more instructions, the I/O interface 110(1) communicates and interacts with the I/O interface 110(2) on node 2 102(2) to cause the updated data to be stored into memory location 306. As part of this interaction, the I/O interface 110(1) may provide to I/O interface 110(2) the updated data, the physical address HNPA of the corresponding memory location 306, and the physical address DEPA of the directory entry 308.

As part of storing the updated data into corresponding memory location 306, the I/O interface 110(2) on node 2 102(2) accesses and locks the directory entry 308. After the directory entry 308 is locked, the I/O interface 110(2) stores the updated data into memory location 306. The I/O interface 110(2) also reads the contents of the directory entry 308. As noted previously, the directory entry 308 contains information indicating which sharer node(s) is/are currently valid sharers of the memory location 306 with which the directory entry 308 is associated. For the sake of example, it will be assumed that node 1 102(1) and node 3 102(3) are currently valid sharers of memory location 306. Using an address translation table, the I/O interface 110(2) determines that the physical address HNPA of the corresponding memory location 306 is mapped to virtual address SVA1. Using SVA1, the I/O interface 110(2) accesses index structure portion 320(2). From this index structure portion 320(2), the I/O interface 110(2) sees the physical address SNPA(1) of the mirrored memory location 316(1) on node 1 102(1) that mirrors memory location 306, and the physical address SNPA(3) of the mirrored memory location 316(3) on node 3 102(3) that mirrors memory location 306. Since the data in corresponding memory location 306 has been updated, the data in mirrored memory locations 316(1) and 316(3) may need to be invalidated to prevent the sharer nodes 102(1) and 102(3) from using invalid data. In the current example, the updated data was propagated from sharer node 1 102(2). Thus, the data in the mirrored memory location 316(1) on node 1 102(1) does not need to be invalidated. Accordingly, the I/O interface 110(2) invalidates the data in the mirrored memory location 316(3) on node 3 102(3).

To do so, the I/O interface 110(2) communicates and interacts with the I/O interface 110(3) on node 3 102(3) to cause the I/O interface 110(3) on node 3 102(3) to store a special data value (which is used by node 3 102(3) to indicate invalid data) into memory location 316(3) to, in effect, invalidate the data stored in memory location 316(3). As part of this interaction, the I/O interface 110(2) may provide to the I/O interface 110(3) on node 3 102(3) the physical address SNPA(3) of the memory location 316(3) and the special data value. After that is done, the I/O interface 110(2) updates the directory entry 308 such that the directory entry no longer indicates node 3 102(3) as being a valid sharer of corresponding memory location 306. The I/O interface 110(2) also unlocks the directory entry 308. Once that is done, the I/O interface 110(2) on node 2 102(2) informs the I/O interface 110(1) on node 1 102(1) that the updated data for corresponding memory location 306 has been successfully propagated. In turn, the I/O interface 110(1) on node 1 102(1) informs the processor 106(1) on node 1 102(1) that the updated data has been successfully propagated. Thereafter, the processor 106(1) removes the entry that contained the updated data destined for corresponding memory location 306 from the store buffer 318(1). In the manner described, invalidation of the data in the mirrored memory location 316(3) of a sharer node 102(3) may be performed by a home node 102(2) instead of a sharer node 102(1). One of the desirable aspects of this approach is that it eliminates the need to pass the contents of the directory entry 308 from the home node 102(2) to the sharer node 102(1). Another desirable aspect is that, because the sharer node 102(1) does not have to perform the invalidation, the sharer node 102(1) does not need to maintain information in its index structure 320(1) about other sharer nodes 102(3) that are sharing the corresponding memory location 308. Hence, this information does not need to be broadcasted during initialization (it only needs to be provided to the home node 102(2)).

These and other alternative approaches are within the scope of the present invention.

Home Node Load and Store

In one embodiment, a home node 102(2) may perform a load from a memory location that is within the shared memory portion 302 of its main memory 108(2) in the same manner that it would a load from any other memory location. In one embodiment, data in the memory locations within the shared memory portion 302 are assumed to be always valid. Thus, there is no need to provide any special handling for these loads.

Store operations, however, that target memory locations within the shared memory portion 302 of the home node's main memory 108(2) may be handled specially. During regular operation, one or more processors 106(2) on the home node 102(2) may execute a set of program instructions (e.g. operating system 114(2), one or more of the applications 118(2), etc.) pertaining to a particular thread of execution. While executing this set of program instructions, the processor 106(2) may wish to store a set of updated data into a particular memory location that is within the shared memory portion 302 of the home node's main memory 108(2). For purposes of the following discussion, it will be assumed that the store operation targets memory location 306, which has a physical address of HNPA, to which the shared virtual address SVA1 is mapped.

To carry out the store operation, the processor 106(2), in one embodiment, initially accesses the index structure portion 320(2) for the shared virtual address SVA1 to which the memory location 306 is mapped. From the information in this index structure portion 320(2), the processor 106(2) can see that no home node is identified; thus, it knows that it is acting as the home node in this instance. The processor 106(2) also knows from the index structure portion 320(2) that the physical address of the directory entry 308 associated with memory location 306 is DEPA. Using this physical address, the processor 106(2) accesses (block 704 of FIG. 7) the directory entry 308, locks the directory entry 308, and reads its contents.

From the contents of the directory entry 308, the processor 106(2) determines which node/nodes (if any) is/are currently a valid sharer of memory location 306. For the sake of example, it will be assumed that the directory entry 308 indicates that node 1 102(1) and node 3 102(3) are currently valid sharers of memory location 306. This means that node 1 102(1) has a mirrored memory location 316(1) in its main memory 108(1) that mirrors memory location 306, and that the mirrored memory location 316(1) currently contains valid data. It also means that node 3 102(3) has a mirrored memory location 316(3) in its main memory 108 (3) that mirrors memory location 306, and that the mirrored memory location 316(3) currently contains valid data. Because data in memory location 306 is about to be updated, the data in memory locations 316(1) and 316(3) are about to be made invalid. To prevent node 1 102(1) and node 3 102(3) from using invalid data, the processor 106(2), in one embodiment, causes (block 708 of FIG. 7) the data in memory locations 316(1) and 316(3) to be invalidated.

The processor 106(2) may do so by obtaining, from the index structure portion 320(2), the node identifier of node 1 102(1) and the physical address SNPA(1) of the mirrored memory location 316(1) on node 1 102(1). The processor 106(2) may then send one or more instructions to the I/O interface 110(2) on node 2 102(2) to cause the I/O interface 110(2) to invalidate the data in memory location 316(1) of node 1 102(1). As part of the one or more instructions, the processor 106(2) may provide to the I/O interface 110(2) the node identifier of node 1 102(1), the physical address SNPA(1) of the memory location 316(1) on node 1 102(1), and a special data value that is used by node 1 102(1) to indicate invalid data.

In response to the one or more instructions, the I/O interface 110(2) communicates and interacts with the I/O interface 110(1) on node 1 102(1) to cause the I/O interface 110(1) on node 1 102(1) to store the special data value into memory location 316(1) to indicate that the data in memory location 316(1) is now invalid. As part of this interaction, the I/O interface 110(2) may provide to the I/O interface 110(1) on node 1 102(1) the physical address SNPA(1) of the memory location 316(1) and the special data value.

The processor 106(2) may also obtain, from the index structure portion 320(2), the node identifier of node 3 102(3) and the physical address SNPA(3) of the memory location 316(3) on node 3 102(3). The processor 106(2) may then send one or more instructions to the I/O interface 110(2) on node 2 102(2) to cause the I/O interface 110(2) to invalidate the data in memory location 316(3) on node 3 102(3). As part of the one or more instructions, the processor 106(2) may provide to the I/O interface 110(2) the node identifier of node 3 102(3), the physical address SNPA(3) of the memory location 316(3) on node 3 102(3), and a special data value that is used by node 3 102(3) to indicate invalid data.

In response to the one or more instructions, the I/O interface 110(2) communicates and interacts with the I/O interface 110(3) on node 3 102(3) to cause the I/O interface 110(3) on node 3 102(3) to store the special data value into memory location 316(3) to indicate that the data in memory location 316(3) is now invalid. As part of this interaction, the I/O interface 110(2) may provide to the I/O interface 110(3) on node 3 102(3) the physical address SNPA(3) of the memory location 316(3) and the special data value.

The processor 106(2) may repeat the above invalidation process for each of the sharer nodes indicated by the directory entry 308 as being a valid sharer of memory location 306. After that is done, the processor 106(2) updates (block 712 of FIG. 7) the directory entry 308 such that the directory entry 308 no longer indicates any sharer nodes as being a valid sharer of memory location 306. In addition, the processor 106(2) stores (block 716 of FIG. 7) the updated data into memory location 306, and unlocks (block 720 of FIG. 7) the directory entry 308. The store operation is thus complete. The processor 106(2) may thereafter continue operation in accordance with the program instructions pertaining to the particular thread of execution.

Alternative Embodiment(s)

Figure 7:
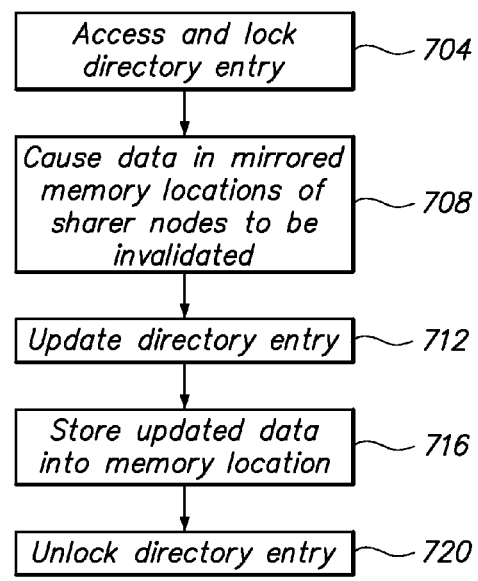
FIG. 7 shows an operational flow diagram illustrating the operations performed by a home node in storing data to a memory location, in accordance with one embodiment of the present invention.

In the embodiment described above, the processor 106(2) participates in the operations shown in blocks 704 through 720 of FIG. 7. As an alternative, these operations may be performed completely by the I/O interface 110(2) instead. With such an arrangement, the processor 106(2) may simply send one or more instructions to the I/O interface 110(2) to ask the I/O interface 110(2) to store the updated data into memory location 306, to which virtual address SVA1 is mapped. In response, the I/O interface 110(2) will, without further input from the processor 106(2): (a) access and lock the directory entry 308; (b) interact with the I/O interface 110(1) on sharer node 1 102(1) to invalidate the data stored in memory location 316(1) of sharer node 1 102(1); (c) interact with the I/O interface 110(3) on sharer node 3 102(3) to invalidate the data stored in memory location 316(3) of sharer node 3 102(3); (d) update the directory entry 308; (e) store the updated data into memory location 306; and (f) unlock the directory entry 308. With this alternative arrangement, much of the data update burden is removed from the processor 106(1).

Also, in the embodiment described above, invalidation of the mirrored memory locations 316(1) and 316(3) is performed at the time that the update data is stored into memory location 306. As an alternative, invalidation of the mirrored memory locations 316(1) and 316(3) may be performed at a later time. Under this arrangement, the processor 106(2) may lock the directory entry 308, store the updated data into memory location 306, unlock the directory entry 308, and store an entry into a store buffer (not shown). This entry may include the virtual address SVA1 that is mapped to memory location 306, and optionally the thread identifier of the thread that the processor 106(2) is executing (this thread identifier allows all entries pertaining to a thread to be quickly identified).

At a later time, information in the entry is retrieved from the store buffer, and the data in the appropriate mirrored memory locations is invalidated. In one embodiment, this is achieved by having one or more processors 106(2) on the home node 2 102(2) execute a set of invalidation instructions. These invalidation instructions may be part of the program instructions that caused the updated data to be stored into the memory location 306, or they may be part of a separate set of program instructions. The invalidation instructions may be executed as part of the same thread as the store operation that caused the updated data to be stored into memory location 306, or as part of a different thread. The processor 106(2) that executes the invalidation instructions may be the same processor 106(2) that executed the instructions that caused the updated data to be stored into memory location 306, or it may be a different processor.

Under control of the invalidation instructions, the processor 106(2) retrieves the information from the entry. This information includes the virtual address SVA1. Using SVA1, the processor 106(2) accesses the index structure portion 320(2), and obtains the physical address DEPA of the directory entry 308, the node identifier of node 1, the physical address SNPA(1) of the mirrored memory location 316(1) on node 1 102(1), the node identifier of node 3, and the physical address SNPA(3) of the mirrored memory location 316(3) on node 3 102(3). Using DEPA, the processor 106(2) locks and accesses the contents of the directory entry 308, which indicate that node 1 102(1) and node 3

102(3) are currently valid sharers of memory location 306. Based upon this information, and the information obtained from the index structure portion 320(2), the processor 106(2) knows to invalidate the data in mirrored memory location 316(1) of node 1 102(1) and mirrored memory location 316(3) of node 3 102(3). The processor 106(2) may do so by sending one or more instructions to the I/O interface 110(2) and having the I/O interface 110(2) communicate and interact with I/O interfaces 110(1) and 110(3) in the manner described above. After the data in the mirrored memory locations 316(1) and 316(3) is invalidated, the processor 106(2) updates the directory entry 308 such that the directory entry 308 no longer indicates any sharer nodes as being a valid sharer of memory location 306. In addition, the processor 106(2) unlocks the directory entry 308. Furthermore, the processor 106(2) removes the entry from the store buffer. In this manner, invalidation of the mirrored memory locations may be carried out at a time after the data in the memory location 306 is updated.

These and other alternative approaches are within the scope of the present invention.

At this point, it should be noted that although the invention has been described with reference to specific embodiments, it should not be construed to be so limited. Various modifications may be made by those of ordinary skill in the art with the benefit of this disclosure without departing from the spirit of the invention. Thus, the invention should not be limited by the specific embodiments used to illustrate it but only by the scope of the issued claims.

What is claimed is:

1. A first node for use in a distributed computing system, the first node comprising:
    a first main memory, wherein a first memory location in the first main memory is usable to mirror a second memory location in a second main memory on a second node of the distributed computing system, wherein said first memory location stores first data that includes a first data value;
    one or more sets of program instructions; and
    one or more processors;
    where the one or more sets of program instructions, when executed by the one or more processors, would cause the one or more processors to perform the operations of:
    loading said first data value from the first memory location of the first main memory;
    determining whether the first data value is the same as a special data value, wherein the special data value is a predetermined value that is used to indicate invalid data; and
    in response to a determination that the first data value is the same as the special data value:
        causing valid data to store in place of said first data in the first memory location of the first main memory to be obtained from the second memory location of the second main memory.

2. The first node of claim 1, wherein the first node further comprises a storage buffer, and wherein the one or more sets of program instructions, when executed by the one or more processors, would cause the one or more processors to further perform the operations of:
    in response to a determination that the first data value is the same as the special data value:
        storing the valid data from the second memory location of the second main memory into an interim memory location in the first main memory;
        obtaining updated data from the storage buffer, wherein the updated data is intended to be stored in the second memory location of the second main memory of the second node but has not been propagated to the second node yet;
        updating the valid data in the interim memory location with the updated data to derive a set of modified valid data; and
        storing the modified valid data from the interim memory location into the first memory location of the first main memory.

3. The first node of claim 1, wherein the one or more sets of program instructions, when executed by the one or more processors, would cause the one or more processors to further perform the operation of:
    during initialization, storing the special data value into the first memory location of the first main memory.

4. The first node of claim 1, wherein the one or more sets of program instructions, when executed by the one or more processors, would cause the one or more processors to further perform the operations of:
    in response to a determination that the first data value is the same as the special data value:
        prior to causing valid data to be obtained from the second memory location of the second main memory:
            obtaining a local lock on the first memory location of the first main memory;
            loading data again from the first memory location of the first main memory, wherein the data has a second data value which may be the same as or different from the first data value; and
            determining whether the second data value is the same as the special data value;
        wherein the operation of causing valid data to be obtained from the second memory location of the second main memory is performed only if the second data value is the same as the special data value.

5. The first node of claim 1,
    wherein causing valid data to be obtained from the second memory location of the second main memory comprises:
        causing a directory entry associated with the second memory location of the second main memory to be locked, wherein the directory entry is stored in the second main memory; and
    wherein the one or more sets of program instructions, when executed by the one or more processors, would cause the one or more processors to further perform the operation of:
    in response to a determination that the first data value is the same as the special data value:
        causing, after the valid data is obtained from the second memory location of the second main memory: (a) the directory entry to be updated to indicate that the first node is now a valid sharer of the second memory location of the second main memory; and (b) the directory entry to be unlocked.

6. The first node of claim 1,
    wherein the first node further comprises a storage buffer;
    wherein causing valid data to be obtained from the second memory location of the second main memory comprises:
        causing a directory entry associated with the second memory location of the second main memory to be locked, wherein the directory entry is stored in the second main memory; and wherein the one or more sets of program instructions, when executed by the one or more processors, would cause the one or more processors to further perform the operations of:

in response to a determination that the first data value is the same as the special data value:
storing the valid data from the second memory location of the second main memory into an interim memory location in the first main memory;
obtaining updated data from the storage buffer, wherein the updated data is intended to be stored in the second memory location of the second main memory of the second node but has not been propagated to the second node yet;
updating the valid data in the interim memory location with the updated data to derive a set of modified valid data;
storing the modified valid data from the interim memory location into the first memory location of the first main memory; and
causing: (a) the directory entry to be updated to indicate that the first node is now a valid sharer of the second memory location of the second main memory; and (b) the directory entry to be unlocked.

7. The first node of claim 1,
wherein the first node further comprises a first input/output (I/O) interface;
wherein causing valid data to be obtained from the second memory location of the second main memory comprises:
the one or more processors providing one or more instructions to the first I/O interface to cause the I/O interface to obtain valid data from the second memory location of the second main memory; and
wherein the first I/O interface is configured to respond to the one or more instructions from the one or more processors by interacting with a second I/O interface on the second node to obtain from the second I/O interface the valid data from the second memory location of the second main memory.

8. The first node of claim 1,
wherein the first node further comprises a first input/output (I/O) interface;
wherein causing valid data to be obtained from the second memory location of the second main memory comprises:
the one or more processors providing one or more instructions to the first I/O interface to cause the I/O interface to obtain valid data from the second memory location of the second main memory; and
wherein the first I/O interface is configured to respond to the one or more instructions from the one or more processors by interacting with a second I/O interface on the second node to: (a) cause a directory entry associated with the second memory location of the second main memory to be locked, wherein the directory entry is stored in the second main memory; (b) obtain the valid data from the second memory location of the second main memory; (c) cause the directory entry to be updated to indicate that the first node is now a valid sharer of the second memory location of the second main memory; and (d) cause the directory entry to be unlocked.

9. The first node of claim 1,
wherein the first node further comprises a storage buffer;
wherein the first node further comprises a first input/output (I/O) interface;
wherein causing valid data to be obtained from the second memory location of the second main memory comprises:
the one or more processors providing one or more instructions to the first I/O interface to cause the I/O interface to obtain valid data from the second memory location of the second main memory; and
wherein the first I/O interface is configured to respond to the one or more instructions from the one or more processors by: (a) interacting with a second I/O interface on the second node: (i) to cause a directory entry associated with the second memory location of the second main memory to be locked, wherein the directory entry is stored in the second main memory; and (ii) to obtain the valid data from the second memory location of the second main memory; (b) storing the valid data from the second memory location of the second main memory into an interim memory location in the first main memory; (c) obtaining updated data from the storage buffer, wherein the updated data is intended to be stored in the second memory location of the second main memory of the second node but has not been propagated to the second node yet; (d) updating the valid data in the interim memory location with the updated data to derive a set of modified valid data; (e) storing the modified valid data from the interim memory location into the first memory location of the first main memory; and (f) interacting with the second I/O interface: (i) to cause the directory entry to be updated to indicate that the first node is now a valid sharer of the second memory location of the second main memory; and (ii) to cause the directory entry to be unlocked.

10. The first node of claim 1,
wherein the first node further comprises a storage buffer; and
wherein the one or more sets of program instructions, when executed by the one or more processors, would cause the one or more processors to further perform the operations of:
in response to a determination that the first data value is the same as the special data value:
prior to causing valid data to be obtained from the second memory location of the second main memory:
obtaining updated data from the storage buffer, wherein the updated data is intended to be stored in the second memory location of the second main memory of the second node but has not been propagated to the second node yet; and
causing the updated data to be propagated to the second node and stored into the second memory location of the second main memory to give rise to an updated set of data which represents valid data.

11. A first node for use in a distributed computing system, the first node comprising:
a first main memory, wherein a first memory location in the first main memory is usable to mirror a second memory location in a second main memory on a second node of the distributed computing system, wherein said first memory location stores first data that includes a first data value;
a store buffer;
one or more sets of program instructions; and
one or more processors;

where the one or more sets of program instructions, when executed by the one or more processors, would cause the one or more processors to perform the operations of:

loading said first data value from the first memory location of the first main memory;

determining whether the first data value is the same as a special data value, wherein the special data value is a predetermined value that is used to indicate invalid data;

in response to a determination that the first data value is not the same as the special data value, storing updated data into the first memory location of the first main memory;

in response to a determination that the first data value is the same as the special data value, foregoing storing the updated data into the first memory location of the first main memory; and storing the updated data into the store buffer for eventual propagation to the second node to be stored within the second memory location of the second main memory.

12. The first node of claim 11, wherein storing the updated data into the store buffer comprises:

determining whether the store buffer contains existing updated data that is destined for the second memory location of the second main memory; and in response to a determination that the store buffer contains existing updated data that is destined for the second memory location of the second main memory, merging the updated data with the existing updated data in the store buffer.

13. The first node of claim 11, wherein the first node further comprises a first input/output (I/O) interface; and wherein the first I/O interface is configured to interact with a second I/O interface on the second node to cause the updated data to be propagated to the second node and stored into the second memory location of the second main memory.

14. The first node of claim 11, wherein the first node further comprises a first input/output (I/O) interface; and wherein the first I/O interface is configured to interact with a second I/O interface on the second node to cause: (a) a directory entry associated with the second memory location of the second main memory to be locked, wherein the directory entry is stored on the second node; (b) the updated data to be stored into the second memory location of the second main memory; and (c) the directory entry to be unlocked.

15. The first node of claim 11, wherein the second memory location of the second main memory is also mirrored in a third memory location of a third main memory of a third node;

wherein the first node further comprises a first input/output (I/O) interface;

wherein the first I/O interface is configured to interact with a second I/O interface on the second node to cause the updated data to be stored into the second memory location of the second main memory; and wherein the first I/O interface is configured to interact with a third I/O interface on the third node to cause data in the third memory location of the third main memory to be invalidated.

16. The first node of claim 11, wherein the second memory location of the second main memory is also mirrored in a third memory location of a third main memory of a third node;

wherein the first node further comprises a first input/output (I/O) interface;

wherein the first I/O interface is configured to interact with a second I/O interface on the second node to cause the updated data to be stored into the second memory location of the second main memory; and wherein the first I/O interface is configured to interact with a third I/O interface on the third node to cause the special data value, or another special data value, to be stored into the third memory location of the third main memory to indicate that data in the third memory location of the third main memory is invalid.

17. The first node of claim 11, wherein the second memory location of the second main memory is also mirrored in a third memory location of a third main memory of a third node;

wherein the first node further comprises a first input/output (I/O) interface;

wherein the first I/O interface is configured to interact with a second I/O interface on the second node to cause: a directory entry associated with the second memory location of the second main memory to be accessed and locked, wherein the directory entry is stored on the second node, and wherein information in the directory entry indicates that the third node is currently a valid sharer of the second memory location of the second main memory; the updated data to be stored into the second memory location of the second main memory; the information in the directory entry to be updated such that the information no longer indicates the third node as a valid sharer of the second memory location of the second main memory; and the directory entry to be unlocked; and wherein the first I/O interface is configured to interact with a third I/O interface on the third node to cause data in the third memory location of the third main memory to be invalidated.

18. The first node of claim 11, wherein the second memory location of the second main memory is also mirrored in a third memory location of a third main memory of a third node;

wherein the first node further comprises a first input/output (I/O) interface;

wherein the first I/O interface is configured to interact with a second I/O interface on the second node to cause: a directory entry associated with the second memory location of the second main memory to be accessed and locked, wherein the directory entry is stored on the second node, and wherein information in the directory entry indicates that the third node is currently a valid sharer of the second memory location of the second main memory; the updated data to be stored into the second memory location of the second main memory; the information in the directory entry to be updated such that the information no longer indicates the third node as a valid sharer of the second memory location of the second main memory; and the directory entry to be unlocked; and wherein the first I/O interface is configured to interact with a third I/O interface on the third node to cause the special data value, or another special data value, to be stored into the third memory location of the third main memory to indicate that data in the third memory location of the third main memory is invalid.

19. The first node of claim 11,
wherein the second memory location of the second main memory is also mirrored in a third memory location of a third main memory of a third node;
wherein the first node further comprises a first input/output (I/O) interface; and
wherein the first I/O interface is configured to interact with a second I/O interface on the second node to cause the second I/O interface to: (a) access and lock a directory entry that is associated with the second memory location of the second main memory, wherein the directory entry is stored on the second node, and wherein information in the directory entry indicates that the third node is currently a valid sharer of the second memory location of the second main memory; (b) store the updated data into the second memory location of the second main memory; (c) interact with a third I/O interface on the third node to cause the special data value, or another special data value, to be stored into the third memory location of the third main memory to indicate that data in the third memory location of the third main memory is invalid; (d) update the information in the directory entry to no longer indicate the third node as a valid sharer of the second memory location of the second main memory; and (e) unlock the directory entry.

20. A second node for use in a distributed computing system comprising a first node and the second node, the second node comprising:
a second main memory, wherein a second memory location in the second main memory is usable to be mirrored in a first memory location in a first main memory on the first node;
one or more sets of program instructions; and
one or more processors;
wherein the one or more sets of program instructions, when executed by the one or more processors, would cause the one or more processors to perform the operations of:
storing updated data into the second memory location of the second memory; and
causing data currently stored in the first memory location of the first main memory to be a predetermined special data value, wherein the special data value is used to indicate invalid data.

21. The second node of claim 20, wherein the one or more sets of program instructions, when executed by the one or more processors, would cause the one or more processors to further perform the operations of:
accessing a directory entry associated with the second memory location of the second main memory, wherein information in the directory entry indicates that the first node is currently a valid sharer of the second memory location of the second main memory; and
updating the information in the directory entry such that the information no longer indicates the first node as being a valid sharer of the second memory location of the second main memory.

22. The second node of claim 20, wherein the one or more sets of program instructions, when executed by the one or more processors, would cause the one or more processors to further perform the operations of:
accessing and locking a directory entry associated with the second memory location of the second main memory, wherein information in the directory entry indicates that the first node is currently a valid sharer of the second memory location of the second main memory;
updating the information in the directory entry such that the information no longer indicates the first node as being a valid sharer of the second memory location of the second main memory; and
unlocking the directory entry.

23. The second node of claim 20,
wherein the second node further comprises a second input/output (I/O) interface;
wherein causing data currently stored in the first memory location of the first main memory to be the predetermined special value comprises:
providing one or more instructions to the second I/O interface to instruct the second I/O interface to invalidate data currently stored in the first memory location of the first main memory; and
wherein the second I/O interface is configured to respond to the one or more instructions by interacting with a first I/O interface on the first node to cause the first I/O interface to invalidate the data currently stored in the first memory location of the first main memory.

24. The second node of claim 20,
wherein the second node further comprises a second input/output (I/O) interface;
wherein causing data currently stored in the first memory location of the first main memory to be the predetermined special value comprises:
providing one or more instructions to the second I/O interface to instruct the second I/O interface to invalidate data currently stored in the first memory location of the first main memory; and
wherein the second I/O interface is configured to respond to the one or more instructions by interacting with a first I/O interface on the first node to cause the first I/O interface to store a predetermined special data value into the first memory location of the first main memory, wherein the special data value is used to indicate that data in the first memory location of the first main memory is invalid.

25. The second node of claim 20, wherein the second node further comprises a store buffer, and wherein causing data currently stored in the first memory location of the first main memory to be the predetermined special value comprises:
storing information into a store buffer, wherein the information indicates, or is usable to determine, that data currently stored in the first memory location of the first main memory is to be invalidated;
retrieving the information from the store buffer; and
causing data currently stored in the first memory location of the first main memory to be invalidated.

26. A method comprising:
loading said first data value from a first memory location of a first main memory on a first node of a distributed computing system, wherein the first memory location in the first main memory is usable to mirror a second memory location in a second main memory on a second node of the distributed computing system, wherein said first memory location stores first data that includes a first data value;
determining whether the first data value is the same as a special data value, wherein the special data value is a predetermined value that is used to indicate invalid data; and
in response to a determination that the first data value is the same as the special data value:

causing valid data to store in place of said first data in the first memory location of the first main memory to be obtained from the second memory location of the second main memory.

27. The method of claim 26, wherein the first node further comprises a storage buffer, the method further comprising:
in response to a determination that the first data value is the same as the special data value:
storing the valid data from the second memory location of the second main memory into an interim memory location in the first main memory;
obtaining updated data from the storage buffer, wherein the updated data is intended to be stored in the second memory location of the second main memory of the second node but has not been propagated to the second node yet;
updating the valid data in the interim memory location with the updated data to derive a set of modified valid data; and
storing the modified valid data from the interim memory location into the first memory location of the first main memory.

28. The method of claim 26 further comprising:
during initialization, storing the special data value into the first memory location of the first main memory.

29. The method of claim 26 further comprising:
wherein the first node further comprises a first input/output (I/O) interface;
wherein causing valid data to be obtained from the second memory location of the second main memory comprises:
providing one or more instructions to the first I/O interface to cause the I/O interface to obtain valid data from the second memory location of the second main memory; and
wherein the first I/O interface is configured to respond to the one or more instructions by interacting with a second I/O interface on the second node to obtain from the second I/O interface the valid data from the second memory location of the second main memory.

30. The method of claim 26, wherein the first node further comprises a storage buffer, the method further comprising:
in response to a determination that the first data value is the same as the special data value:
prior to causing valid data to be obtained from the second memory location of the second main memory:
obtaining updated data from the store buffer, wherein the updated data is intended to be stored in the second memory location of the second main memory of the second node but has not been propagated to the second node yet; and
causing the updated data to be propagated to the second node and stored into the second memory location of the second main memory to give rise to an updated set of data which represents valid data.

31. A method comprising:
loading a first data value from a first memory location of a first main memory on a first node of a distributed computing system, wherein the first memory location in the first main memory is usable to mirror a second memory location in a second main memory on a second node of the distributed computing system, wherein said first memory location stores first data that includes a first data value;

determining whether the first data value is the same as a special data value, wherein the special data value is a predetermined value that is used to indicate invalid data;
in response to a determination that the first data value is not the same as the special data value, storing updated data into the first memory location of the first main memory;
in response to a determination that the first data value is the same as the special data value, foregoing storing the updated data into the first memory location of the first main memory; and
storing the updated data into a store buffer of the first node for eventual propagation to the second node to be stored within the second memory location of the second main memory.

32. The method of claim 31, wherein storing the updated data into the store buffer comprises:
determining whether the store buffer contains existing updated data that is destined for the second memory location of the second main memory; and
in response to a determination that the store buffer contains existing updated data that is destined for the second memory location of the second main memory, merging the updated data with the existing updated data in the store buffer.

33. The method of claim 31,
wherein the first node further comprises a first input/output (I/O) interface; and
wherein the first I/O interface is configured to interact with a second I/O interface on the second node to cause the updated data to be propagated to the second node and stored into the second memory location of the second main memory.

34. The method of claim 31,
wherein the first node further comprises a first input/output (I/O) interface; and
wherein the first I/O interface is configured to interact with a second I/O interface on the second node to cause: (a) a directory entry associated with the second memory location of the second main memory to be locked, wherein the directory entry is stored on the second node; (b) the updated data to be stored into the second memory location of the second main memory; and (c) the directory entry to be unlocked.

35. The method of claim 31,
wherein the second memory location of the second main memory is also mirrored in a third memory location of a third main memory of a third node;
wherein the first node further comprises a first input/output (I/O) interface;
wherein the first I/O interface is configured to interact with a second I/O interface on the second node to cause the updated data to be stored into the second memory location of the second main memory; and
wherein the first I/O interface is configured to interact with a third I/O interface on the third node to cause data in the third memory location of the third main memory to be invalidated.

36. A method comprising:
storing updated data into a second memory location of a second main memory on a second node of a distributed computing system, wherein the second memory location in the second main memory is usable to be mirrored in a first memory location in a first main memory on a first node; and causing data currently stored in the first memory location of the first main memory to be a predetermined special data value, wherein the special data value is used to indicate invalid data.

37. The method of claim 36 further comprising:

accessing a directory entry associated with the second memory location of the second main memory, wherein information in the directory entry indicates that the first node is currently a valid sharer of the second memory location of the second main memory; and updating the information in the directory entry such that the information no longer indicates the first node as being a valid sharer of the second memory location of the second main memory.

38. The method of claim 36 further comprising:

accessing and locking a directory entry associated with the second memory location of the second main memory, wherein information in the directory entry indicates that the first node is currently a valid sharer of the second memory location of the second main memory;

updating the information in the directory entry such that the information no longer indicates the first node as being a valid sharer of the second memory location of the second main memory; and unlocking the directory entry.

39. The method of claim 36, wherein the second node further comprises a second input/output (I/O) interface;

wherein causing data currently stored in the first memory location of the first main memory to be the predetermined special data value comprises:

providing one or more instructions to the second I/O interface to instruct the second I/O interface to invalidate data currently stored in the first memory location of the first main memory; and wherein the second I/O interface is configured to respond to the one or more instructions by interacting with a first I/O interface on the first node to cause the first I/O interface to invalidate the data currently stored in the first memory location of the first main memory.

\* \* \* \* \*

UNITED STATES PATENT AND TRADEMARK OFFICE
CERTIFICATE OF CORRECTION

PATENT NO.       : 9,679,084 B2
APPLICATION NO.  : 13/828983
DATED            : June 13, 2017
INVENTOR(S)      : Loewenstein It is certified that error appears in the above-identified patent and that said Letters Patent is hereby corrected as shown below:

On page 2, Column 2, item (56) References cited, under Other Publications, Line 31, delete "Prefectching" and insert -- Prefetching --, therefor.

On page 3, Column 1, item (56) References cited, under Other Publications, Line 36, delete "Inux"," and insert -- Linux", --, therefor.

On page 4, Column 2, item (56) References cited, under Other Publications, Line 25, delete "Cohrerence"," and insert -- Coherence", --, therefor.

On page 4, Column 2, item (56) References cited, under Other Publications, Line 26, delete "Symposiumn" and insert -- Symposium --, therefor.

Signed and Sealed this
Twenty-seventh Day of March, 2018

Andrei Iancu
*Director of the United States Patent and Trademark Office*